US012276989B1

(12) United States Patent
Amer et al.

(10) Patent No.: US 12,276,989 B1
(45) Date of Patent: Apr. 15, 2025

(54) SYSTEMS AND METHODS FOR A VIRTUAL FACILITY SUPPORTING ROBOTICS FLEET CONTROL AND SENSOR DATA SIMULATION

(71) Applicant: Claryo, Inc., San Francisco, CA (US)

(72) Inventors: Mohamed Amer, San Francisco, CA (US); Dylan Bourgeois, Brooklyn, NY (US); Stefan Nusser, Palo Alto, CA (US); Pierre-Emmanuel Evreux, San Francisco, CA (US); Kyle Marshall, New York, NY (US); Josh Staker, Tigard, OR (US); Nick Vander Valk, East Brunswick, NJ (US)

(73) Assignee: Claryo, Inc., San Francisco, CA (US)

( * ) Notice: Subject to any disclaimer, the term of this patent is extended or adjusted under 35 U.S.C. 154(b) by 0 days.

(21) Appl. No.: 18/893,656

(22) Filed: Sep. 23, 2024

Related U.S. Application Data

(60) Provisional application No. 63/594,152, filed on Oct. 30, 2023.

(51) Int. Cl.
*G05D 1/69* (2024.01)
*G06N 3/049* (2023.01)
(Continued)

(52) U.S. Cl.
CPC .............. *G05D 1/69* (2024.01); *G06N 3/049* (2013.01); *G06N 7/01* (2023.01); *G06N 10/00* (2019.01);
(Continued)

(58) Field of Classification Search
CPC ............ G05D 1/69; G06N 10/00; G06N 7/01; G06N 3/049; G06N 7/00; G06T 15/20
See application file for complete search history.

(56) References Cited

U.S. PATENT DOCUMENTS

2013/0321245 A1* 12/2013 Harper ................. G05B 19/409
345/7
2017/0109856 A1* 4/2017 Inazumi .................... G06T 7/73
(Continued)

OTHER PUBLICATIONS

"Getting Started with Gazebo?", Open Robotics, Accessed on 2024-09-18 at https://gazebosim.org/docs/latest/getstarted/.
(Continued)

*Primary Examiner* — Kyle O Logan
(74) *Attorney, Agent, or Firm* — Polygon IP, LLP

(57) ABSTRACT

A virtual facility robotics system may include a storage system, a data engine, an integration system, a virtual facility interface system, and a simulator engine. The storage system may store video data of a real facility. The data engine may train a neural rendering model providing a photorealistic three-dimensional representation of the real facility. The integration system may provide facilitate communication with a robot fleet manager configured to control one or more robots operating within the real facility. The virtual facility interface system may provide access to information stored in a virtual facility that includes the photorealistic three-dimensional representation of the real facility. The virtual facility interface system may be configured to provide information to the robot fleet manager via the integration system upon request. The simulator engine may simulate a future state of the real facility including one or more novel views generated based on the neural rendering model.

20 Claims, 31 Drawing Sheets

(51) Int. Cl.
G06N 7/01 (2023.01)
G06N 10/00 (2022.01)
G06T 15/20 (2011.01)
G05D 105/28 (2024.01)
G05D 107/70 (2024.01)
G06N 7/00 (2023.01)

(52) U.S. Cl.
CPC .... G06T 15/20 (2013.01); *G05B 2219/39001* (2013.01); *G05D 2105/28* (2024.01); *G05D 2107/70* (2024.01); *G06N 7/00* (2013.01)

(56) References Cited

U.S. PATENT DOCUMENTS

| 2023/0012186 A1* | 1/2023 | Siegel ................. G07C 5/0833 |
| 2023/0078448 A1* | 3/2023 | Cella ............... G06Q 10/06311 |
| | | 705/7.13 |
| 2024/0094712 A1* | 3/2024 | Emerson .............. G05D 1/6987 |

OTHER PUBLICATIONS

"Programming Multiple Robots with ROS 2", Accessed on Sep. 18, 2024 at https://osrf.github.io/ros2multirobotbook/print.html.
"RTAB-MAP: Real-Time Appearance-Based Mapping", GitHub, Accessed on Sep. 18, 2024 at https://introlab.github.io/rtabmap/.
Tosi et al., "How NeRFs and 3D Gaussian Splatting are Reshaping SLAM: a Survey", arXiv: 2402.13255v2 [cs.CV], Apr. 11, 2024.

\* cited by examiner

CLARYO

- ☐ Dashboard

WORKSPACE
- ☐ Training
- ☐ Evaluation
- ☐ Calibration

RESOURCES
- ☐ Sensors
- ☐ Devices
- ☐ Assets
- ☐ Datasets
- ☐ Models
- ☐ Deployments

UTILITY
- ☐ Docs
- ☐ Settings

V0.0.7-prod
Privacy Policy
Terms of Service

○ Demo User

ACTIONS — 1702

☐ Manage Data
Upload or manage a dataset in claryo.

[ Assets ☐ ] [ Datasets ☐ ]

— 1704

☐ Machine Learning
Train or evaluate a machine learning model in Claryo.

[ Training ☐ ] [ Evaluation ☐ ]

— 1706

☐ Manage Deployments
Deploy and monitor systems in Claryo

[ Devices ☐ ] [ Deployments ☐ ]

Datasets

| NAME | SIZE | CREATED | CONFIGURATION | |
|---|---|---|---|---|
| Lidar Fusion Local Set | 1 asset | a month ago | Xtreme1 | |
| new transfer | 3323 assets | a month ago | CVAT | |
| Same Object Transfer | 3323 assets | a month ago | CVAT | |
| Mix Object Tote | 44249 assets | a month ago | CVAT | |
| Level5 Bag | 1 asset | 2 months ago | Xtreme1 | CC BY-NC-SA 4.0 |
| Nuscenes | 10 assets | 2 months ago | CVAT | |
| Shadi_dlavv3_v0 | 1 asset | 2 months ago | CVAT | |
| Armbench test 6-20 | 3323 assets | 2 months ago | CVAT | |
| VOC | 1 asset | 2 months ago | CVAT | |

CLARYO

- Dashboard

WORKSPACE ⚙
- Training
- Evaluation
- Calibration

RESOURCES ⚙
- Sensors
- Devices
- Assets
- Datasets
- Models
- Deployments

UTILITY
- Docs
- Settings
- V0.0.7-prod
- Privacy Policy
- Terms of Service

○ Demo User [Update]

Topics
Click "Parse file" to extract the topics from your asset. ⟵ 1902

| | Topic | Message Type | Frequency |
|---|---|---|---|
| ☐ | /CAM_BACK/camera_info | Sensor_msgs/Camer... | 10.00 Hz |
| ☐ | /CAM_BACK/image_mark... | Foxglove_msgs/Imag... | 2.00 Hz |
| ☒ | /CAM_BACK/image_mark... | Visualization_msgs/I... | 10.00 Hz |
| ☐ | /CAM_BACK/image_rect... | Sensor_msgs/Compr... | 10.00 Hz |
| ☐ | /CAM_BACK_LEFT/came... | Sensor_msgs/Camer... | 10.00 Hz |
| ☐ | /CAM_BACK_LEFT/image... | Foxglove_msgs/Imag... | 2.00 Hz |
| ☐ | /CAM_BACK_LEFT/image... | Visualization_msgs/... | 10.00 Hz |
| ☒ | /CAM_BACK_LEFT/image... | Sensor_msgs/Compr... | 10.00 Hz |
| ☐ | /CAM_BACK_RIGHT/came... | Sensor_msgs/Camer... | 10.00 Hz |
| ☐ | /CAM_BACK_RIGHT/imag... | Foxglove_msgs/Imag... | 2.00 Hz |

Showing 1 to 10 of 33 results  [Previous] [Next]

[☐ Parse file] [☐ Extraction]

Extracted topics as assets
Currently selected 2 topics. Clicking extract will create a new data asset with selected items.

☐ Sample ☐ Range ☐ Options

Data Options
Folder Structure
All topics will be saved as a single asset. Topic hierarchy will be reproduced as folders and renamed. For example: /my/image/topic will become nested directories for Camera-1.

Single File camera calibration ⟵ 1904  [Calibration]
If the topic contains camera calibration information, it will be saved to a single file if the toggle is on. Otherwise, each camera calibration will be saved separately.

| | | | | | |
|---|---|---|---|---|---|
| CLARYO | Training Evaluation Registry | | | | |
| ☐ Dashboard | Training Jobs | New | Tuner ID | Total Runtime | Total Cost Action |
| WORKSPACE ⚙ | new-exp-na... Starting | | arm-fast | | |
| ☐ Training | demo-exp-a... Starting | | 5fc767b2adf4470a302... | 3h | $3.72 ⋯⋯ ≫ |
| ☐ Evaluation | run-name-1 ⊗ | ⊕ | | | |
| ☐ Calibration | mfv-experim... ⊗ | | Trial ID | Score Running Time | Cost |
| | arm-fast-v2 ⊗ | | 12 ⊕ | — 4m | $0.09 ⊕⊕ View log |
| RESOURCES ⚙ | new-experim... ⊗ | | 11 ⌄ | 0.866 27m | $0.51 |
| ☐ Sensors | unique-exp-f... ⊗ | | Download Full Log | | |
| ☐ Devices | deeplabv3-voc ⊗ | | 0: Loading Log... | | |
| ☐ Assets | arm-fast-fin... ⊗ | | 10 ⌄ | 0.653 10m | $0.19 ⊕⊕ ⬇ |
| ☐ Datasets | arm-fast ⊗ | | 9 ⌄ | 0.847 30m | $0.57 ⊕⊕ ⬇ |
| ☐ Models | voc-full ⊗ | | 8 ⌄ | 0 3m | $0.07 ⊕⊕ ⬇ |
| ☐ Deployments | voc-test-run ⌄ | | 7 ⌄ | 0 3m | $0.06 ⊕⊕ ⬇ |
| | Armbench-v6 ⊗ | | 6 ⌄ | 0 3m | $0.06 ⊕⊕ ⬇ |
| UTILITY | deeplabv3-p... ⌄ | | 5 ⌄ | 0 4m | $0.07 ⊕⊕ ⬇ |
| ☐ Docs | deeplabv3-p... ⊗ | | 4 ⌄ | 0 3m | $0.07 ⊕⊕ ⬇ |
| ☐ Settings | | | 3 ⌄ | 0 12m | $0.23 ⊕⊕ ⬇ |
| V0.0.7-prod | | | 2 ⌄ | 0.695 32m | $0.61 ⊕⊕ ⬇ |
| Privacy Policy | | | 1 ⌄ | 0.819 22m | $0.42 ⊕⊕ ⬇ |
| Terms of Service | | | 0 ⊗ | — — | — ⊕⊕ ⬇ |

2102 — arrow pointing to Trial table area
2100 — overall screen

SYSTEMS AND METHODS FOR A VIRTUAL FACILITY SUPPORTING ROBOTICS FLEET CONTROL AND SENSOR DATA SIMULATION

CROSS-REFERENCE TO RELATED APPLICATIONS

This application claims the benefit under 35 U.S.C. § 119 (e) of U.S. Provisional Patent Application 63/594,152 by Amer, entitled: "Virtual facility robotics system", filed on Oct. 30, 2023, which is incorporated herein by reference in its entirety for all purposes.

FIELD OF TECHNOLOGY

This patent application relates generally to robotics, and more specifically to a virtual facility for supporting robotics operations.

BACKGROUND

Recent years have seen a proliferation of visual sensors, such as 2D cameras, 3D cameras, LiDAR sensors, and the like. Increasingly, spatially aware mobile robots take advantage of such sensors through environment mapping and localization. Camera vision may be used for object recognition and pose detection instead of, or addition to, position-controlled automation. Similarly, composition and service-level integration may be employed for robot management instead of, or in addition to, programmable logic controllers. For these and other reasons, robots are becoming smarter and more adaptive. For instance, static linkage may be replaced with vision and service orchestration. Given the increasing importance of robotics applications, improved techniques for integrating, controlling, simulating, and facilitating robotics operations are desired.

SUMMARY

Techniques and mechanisms described herein provide for a virtual facility robotics system. According to various embodiments, the virtual facility robotics system may include a storage system, an integration system, a virtual facility interface system, and a simulator engine.

According to various embodiments, the storage system may store data collected from a real facility including video of the real facility. The data engine may be configured to train a neural rendering model of the real facility based on the data. The neural rendering model may provide a photo-realistic three-dimensional representation of the real facility. The integration system may provide one or more interfaces facilitating communication with one or more control systems associated with the real facility. The one or more control systems may include a robot fleet manager configured to control one or more robots operating within the real facility. The virtual facility interface system may provide access to information stored in a virtual facility that includes the photorealistic three-dimensional representation of the real facility. The virtual facility interface system may be configured to provide information to the robot fleet manager via the integration system upon request. The simulator engine may be configured to simulate a future state of the real facility based on the virtual facility. The future state of the real facility may include one or more novel views generated based on the neural rendering model.

In some embodiments, the virtual facility includes a plurality of layers including a first layer corresponding to the photorealistic three-dimensional representation. The virtual facility may include a second layer providing a dense reconstruction that includes a three-dimensional point cloud determined based on the data. The virtual facility may include a third layer providing a two-dimensional map of the real facility. The two-dimensional map may include location information for the one or more robots or location information for one or more inventory items located within the real facility. The virtual facility may include a fourth layer indicating one or more facility rules selected from a group consisting of: lane directionality, speed limits, exclusion zones, egress markings, lane markings, exclusion zones markings, presence of objects, and absence of objects.

In some embodiments, the data engine is configured to update the virtual facility based on image data received from the one or more robots.

In some embodiments, the one or more novel views include simulated sensor data that is simulated from a virtual position corresponding to a simulated location for a sensor associated with a robot of the one or more robots.

In some embodiments, the future state of the real facility reflects performance of a simulated workflow by updating a simulated version of the virtual facility based on an action performed by a simulated robot.

In some embodiments, the virtual facility reflects one or more rules governing operation of the real facility, and wherein the future state of the real facility is predicted based on the one or more rules.

In some embodiments, the one or more interfaces includes a facility management system interface facilitating communication with a facility management system providing access to inventory tracking information that identifies locations for a plurality of inventory items stored within the real facility.

In some embodiments, the simulator engine includes a plurality of simulator versions, wherein a first simulator version of the plurality of simulator versions includes a three-dimensional rendering engine providing photorealistic visual fidelity. A second simulator version of the plurality of simulator versions may include a linear velocity model configured to determine simulated analytics values.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for creating and employing a virtual facility. These drawings in no way limit any changes in form and detail that may be made by one skilled in the art without departing from the spirit and scope of the disclosed implementations.

FIGS. 17-30 illustrate user interface views, generated in accordance with one or more embodiments.

DETAILED DESCRIPTION

Introduction

Figure 1:
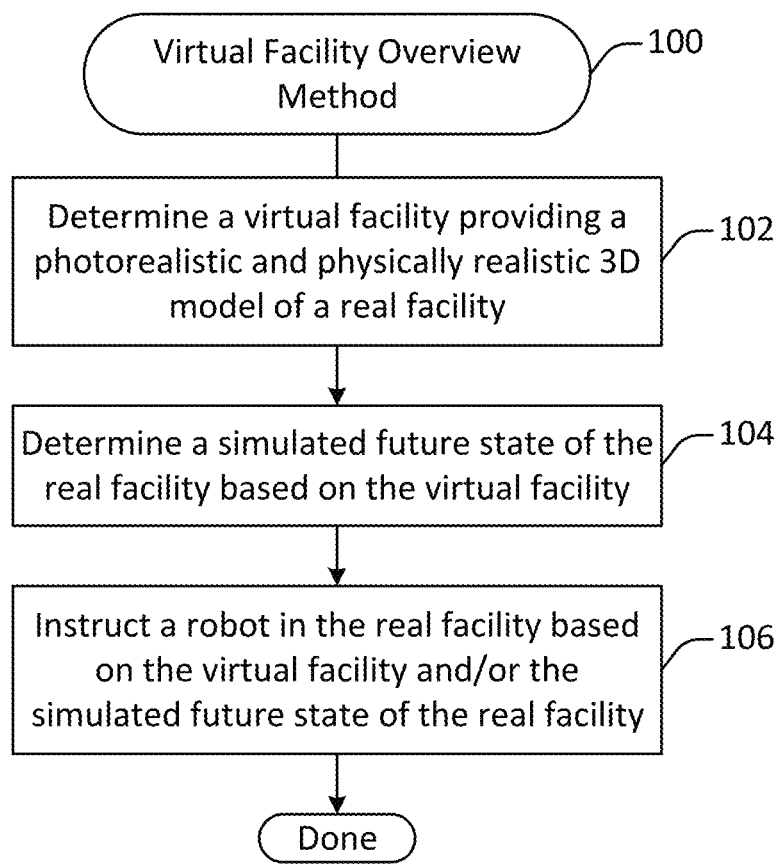
FIG. 1 illustrates an overview method for configuring and employing a virtual facility, performed in accordance with one or more embodiments.

Techniques and mechanisms described herein provide for a virtual facility system. According to various embodiments, system integration may be implemented as an iterative orchestration process that seamlessly transitions into management and optimization of the automation solution. Techniques and mechanisms described herein may provide for an accelerated integration process via a spatial generative AI virtual facility. Such an environment may facilitate an iterative solution design process with frequent communication. In addition, integration with cloud-based systems provides for improved management and observability. Collectively, such an environment may facilitate scenario analysis and optimization and provide for improved monitoring, compliance, and/or insurance of facilities. For example, robot deployments and other facilities operations may be managed and optimized.

According to various embodiments, techniques and mechanisms described herein provide a range of advantages in a logistics environment. For example, friction when integrating automation solutions with facilities management systems may be reduced, resulting in quicker adoption and less downtime. For example, warehouse operational observability may be improved through visual inspection, resulting in less inventory shrinkage, and a safer, and more compliant operation.

In some embodiments, techniques and mechanisms described herein provide for sophisticated facilities monitoring. By integrating facilities data into a virtual facility, the system can be used to visualize non-visual, non-spatial data such as inventory tracking data, or other warehouse transaction data from handheld scanning devices, providing for the representation of point-to-point actions, the identification of inefficiencies, the tracking of inventory, manual processes, and the generation of simulated photorealistic representations of facility operations.

In some embodiments, static cameras may be used to supplement non-visual data such as inventory tracking and process cycle time data. The data generated by the static cameras may be used to determine analytics information based on complex actions and operations performed within the real facility. For instance, in a warehouse environment, characteristics such as pallet assembly time, pallet delivery time, item shipping time, pallets processed per day, boxes processed per data, and/or other such information may be determined from the visual data in combination with the non-visual data.

In some embodiments, dynamic (i.e., mobile) cameras may be used to supplement non-visual, non-spatial data. The data generated by the dynamic cameras may be used to determine analytics information based on rich analysis of images of the real facility. For example, cameras positioned on people, robots, or machines such as forklifts or pallet jacks may be analyzed to identify locations and quantities of inventory items. Such information may then be compared with visualize non-visual, non-spatial data such as inventory tracking data received from a warehouse management system to perform inventory reconciliation.

In some embodiments, techniques and mechanisms described herein may provide warehouse operations with faster evaluation and deployment of automation solutions, a consolidated management interface to facilitate interoperability, and/or a physically realistic and photo-realistic digital twin of a physical environment. Alternatively, or additionally, a systems integrator may be provided with a powerful simulation of an environment using photorealistic and physically realistic 3D visualization, faster development using the virtual environment, and/or faster deployment with pre-existing integration and mapping.

According to various embodiments, techniques and mechanisms described herein may be used in conjunction with many different types of automation solutions. For example, in the warehouse environment, automation solutions for material transport may include, but are not limited to: mobile pallet conveyors, other conveyors, forklifts, cart towing, tow tractors, and other types of autonomous and/or human-assisted mobile robots.

According to various embodiments, techniques and mechanisms described herein may be used to provide a no-code or low-code interface with cloud hosting of machine learning infrastructure training that makes it easy to train and test complex models with minimal experience.

According to various embodiments, techniques and mechanisms described herein may be used to manage robot fleets. Data from and across one or more fleets of robots, including sensor data and other telemetry data, may be transmitted to and aggregated in a cloud computing platform. In some configurations, robot fleets may include robots from different vendors. Furthermore, the term "robot" as used herein encompasses a wide range of fully autonomous, human-assisted, and semi-autonomous devices, including both ground-based devices and aerial devices such as drones.

A virtual facility system may include a photorealistic and physically realistic virtual environment and may provide an interface between and among one or more warehouse management systems, robots, objects, environment elements, and people. Different autonomous mobile robots (AMRs) in the system may have the same or different robot operating systems (ROSs).

In some embodiments, the virtual facility system may allow application engineers to customize, deploy, and monitor fleets in production by providing a range of tools. For example, robot fleets may be configured for deployment by modifying behaviors, fine tuning ML models, calibrating cameras and other sensors, and the like. As another example, the system may allow the evaluation of robot perception, behavior, and/or navigation in the photorealistic and physically realistic simulated 3D model of the physical environment prior to, during, and after deployment. As yet another example, robot fleets may be logged by uploading information such as sensory data and system logs and preparing them for further analysis. As still another example, alerts for failures or issues post deployment may be configured and generated. Although some or all of these features may be provided in a no-code or low-code environment, a software development kit (SDK) may facilitate direct interactions with the full robot stack to further improve components of the system or debug issues flagged during deployment.

In some embodiments, people may interact with the virtual facility system in any of various ways. For example, people may interact via a web-hosted service, localized handheld devices, may directly interact with robots, and/or may interact with robots remotely.

In some embodiments, some operations of the virtual facility system may be classified as solution composition, which relates to the iterative development and communication of an automation solution for an environment. Sensor data from robots, handheld devices, or other sources may be used to generate a virtual facility that provides a photorealistic and physically realistic simulated 3D model of an environment. The virtual facility may then be used to simulate virtual robots by providing simulated photorealistic and physically realistic 3D visual information, depth sensor input data, and/or input to other types of sensors. The virtual facility may be linked with points of interest, warehouse management system locations and lanes, maps, and other such information across potentially multiple robot types, systems, and vendors. Computer vision machine learning models may be trained to recognize common objects in the environment, both for refining the virtual facility and for facilitating object identification by robots, or for inventory audit and cycle count. Computer vision machine learning models may be trained to recognize human activity for process and workflow intelligence and audit. The virtual facility may be shared and linked with other systems, for instance to connect events and actions across potentially multiple robot types, systems, and vendors. The virtual facility may communicate with handheld devices, for instance for localization purposes.

In some embodiments, some operations of the virtual facility system may be classified as solution operation, and may facilitate the management, adaptation, and/or optimization of deployed robot-based automation systems. For example, the virtual facility may be updated in real-time or near real-time. As another example, the virtual facility may be used to monitor operations in real-time or near real-time. As yet another example, the system may provide an integrated management dashboard, for instance to propagate updated maps, points of interest, warehouse management system locations, lanes, and the like to robots deployed in the environment. As still another example, robots, objects, people, and/or other elements of the environment may be tracked across space and time. As still another example, the system may facilitate compliance with rules applied to the environment. As still another example, scenario analysis may be performed, such as a prediction of performance characteristics of aspects of the environment under particular configurations and/or operating conditions.

When using conventional systems, integrating flexible automation solutions typically requires each provider to create a robot-specific navigation map of the facility and annotate it with the corresponding locations received from a facility management system. This approach is tedious, especially for large warehouses, and doesn't scale. In contrast, various embodiments described herein allow the facility operator to scan the facility just once and to map the corresponding facility management system database locations just once. Then, any automation provider onboarded into the virtual facility can build the corresponding robot navigation map used by their fleet and get the corresponding locations without disrupting the facility's day-to-day operations. This approach provides standardization across automation solutions, reducing the repetitive work and providing a single frame of reference. Furthermore, onboarding different fleets through the virtual facility allows interoperability between them, for instance by sharing location information across providers.

Many facilities rely on barcode scanners to locate inventory, which is prone to human error and results in inventory shrinkage. In contrast, various embodiments described herein leverage visual information from depth cameras or LiDAR sensors used by automation solutions for navigation, or from safety and security cameras mounted on ceilings, personnel, or material handling equipment. Such an approach provides a visual-spatial layer that allows the operator to visually track and query their inventory. That is, rather than just knowing the location of an item at the time it is scanned, an item's location may be determined in real time or near-real time. Such an approach provides better observability while keeping the virtual facility up-to-date and reducing inventory shrinkage. In addition, the safety of operations involving humans and robots may be monitored to ensure compliance with safety protocols and to prevent accidents.

In some embodiments, a virtual facility may provide for simulation of a real facility. The system may be used to quickly size and customize one or more robot fleets for specific tasks and across various operating conditions. Scenarios to train and test robot capabilities under multiple conditions may be evaluated and planned. Areas for improvement may be identified through analyzing congestion heatmaps for different workflows and missions, which may allow for quickly identifying deviations. Robot fleets may be onboarded, for instance by building their navigation maps, training their perception stack, configuring their parameters, and integrating them with existing warehouse systems. Fleet sizing and performance may be optimized and evaluated for specific workflows and operational conditions across different vendors. Historical data may be visualized from warehouse systems and used as input for simulating scenarios. Facility traffic may be simulated, and robot capabilities may be evaluated in situ. For instance, the efficiency and reliability of the robot fleet may be tested under various conditions, such as changes in demand, layout modifications, or equipment failures. The virtual facility may be used to facilitate communication with and between various systems and actors, such as a warehouse supervisor, and provide them access to relevant data, simulations, and insights.

FIG. 1 illustrates an overview method 100 for configuring and employing a virtual facility, performed in accordance with one or more embodiments. According to various embodiments, the method 100 may be performed at a virtual facility system within a virtual facility ecosystem. Such systems are discussed in additional detail with respect to FIG. 2, FIG. 3, FIG. 4, and FIG. 5.

A virtual facility is determined at 102. In some embodiments, the virtual facility may serve as a virtual representation of a real facility. Determining the virtual facility may involve collecting sensor data of the virtual facility and then processing that sensor data to determine a photorealistic and physically realistic three-dimensional model of the virtual facility. The 3D model may be supplemented by configuration and integration information such as the locations and configuration of items, people, robots, equipment, machines, and other elements. Processes for determining a virtual facility are discussed in additional detail with respect to FIG. 6, FIG. 7, and FIG. 8.

A simulated future state of the real facility is determined at 104 based on the virtual facility. In some embodiments, the simulated future state of the real facility may be determined by updating one or more elements of the virtual facility based on one or more predictions regarding future actions. For example, the predicted future locations and actions of robots, people, machines, and other elements represented within the virtual facility may be updated based on their historical locations and actions. Such predictions may give rise to a simulated future state of the virtual facility corresponding to a simulated future state of the real facility.

A robot in the real facility is instructed at 106 based on the virtual facility and/or the simulated future state of the real facility. According to various embodiments, the virtual facility and/or the simulated future state of the real facility may be used for any or all of a variety of applications. For example, the simulated future state of the virtual facility may be used to guide robot onboarding decisions, aid in determining an action for a physical robot located in the real facility, guide configuration decisions for the real facility, provide analytics information, and the like. Additional details regarding a method of instructing a robot are discussed with respect to FIG. 10.

System Architecture

Figure 2:
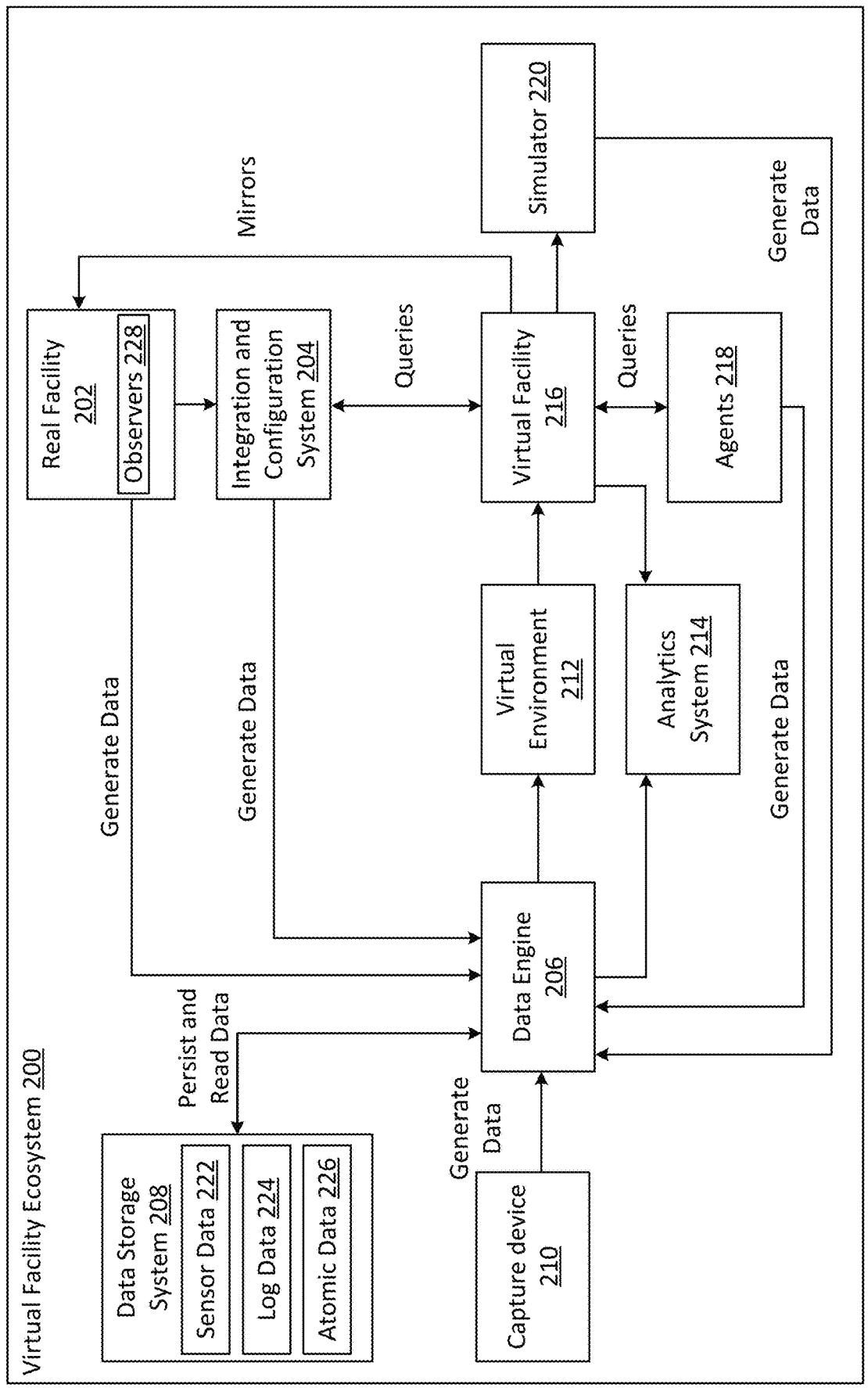
FIG. 2 illustrates a diagram of a virtual facility ecosystem, configured in accordance with one or more embodiments.

FIG. 2 illustrates a diagram of a virtual facility ecosystem 200, configured in accordance with one or more embodiments. The virtual facility ecosystem 200 includes a real facility 202, an integration and configuration system 204, a data engine 206, a data storage system 208, one or more capture devices 210, a virtual environment 212, an analytics system 214, a virtual facility 216, one or more agents 218, and a simulator engine 220.

According to various embodiments, the real facility 202 represents a self-contained location that includes a physical environment. In addition to the physical environment itself, the real facility 202 may include one or more computing systems for management, interaction, and/or communication related to the physical environment.

In some embodiments, the physical environment may be a warehouse. However, various types of physical environments may be employed in accordance with techniques and mechanisms described herein. For example, the physical environment may be indoors (e.g., a warehouse), outdoors (e.g., a train yard), or some combination thereof (e.g., a lumber yard). As another example, the physical environment may be industrial (e.g., a warehouse), commercial (e.g., a restaurant), or residential (e.g., an apartment building). Nevertheless, the physical environment may be referred to herein as a warehouse environment for the purposes of providing a clear and consistent exposition. However, depending on the particular type of physical environment employed, different configurations of systems and components may be employed in keeping with the inventive techniques and mechanisms.

In some embodiments, the real facility 202 may include one or more observers 228. An observer may be a static or dynamic sensor configured to provide data about the real facility 202 to the data engine 206. For example, a static sensor may be a fixed camera located at a designated position within the real facility 202. As another example, a dynamic sensor may be a mobile camera located on material handling equipment, robot sensory data, or person within the real facility 202. Such sensors may capture image data, depth sensor data, audio data, and/or any other type of information.

According to various embodiments, an integration and configuration system 204 may store and transmit information about the real facility 202. For example, in the context of a warehouse environment, the integration and configuration system 204 may include one or more interfaces for one or more warehouse management systems, labor management system, inventory tracking system, robot fleet manager systems, warehouse execution systems, device orchestrators, people management systems, device management systems, and the like.

In some embodiments, the integration and configuration system 204 may be configured to provide information about robots operating in the real facility 202. For instance, the integration and configuration system 204 may be configured to provide information such as the number of robots, the configuration of robots, the navigation stacks included on robots, the tasks assigned to robots, the planned routes being traveled by robots, workflows in which robots are participating, and the like.

In some embodiments, the integration and configuration system 204 may be configured to provide information about people and non-robot devices operating in the real facility 202. For example, the integration and configuration system 204 may be configured to provide information about the number of people, the locations of people, the tasks and roles assigned to people, the devices with which people are equipped, the workflows in which people are participating, and the like.

In some embodiments, the integration and configuration system 204 may be configured to provide information about items located in the real facility 202. For instance, in the warehouse context, the integration and configuration system 204 may be configured to provide information about items stored in the warehouse, orders to be filled with those items, packages that have been created using those items, and more. Information about such items may include, but is not limited to, a quantity, type, location, unique identifier, or other characteristic for an item.

In some embodiments, the integration and configuration system 204 may be configured to provide information about workflows and processes associated with the real facility 202. For example, the integration and configuration system 204 may be configured to provide information about workflows that may be triggered or that are in the process of being performed. As another example, the integration and configuration system 204 may provide information about the operations, people, devices, and/or robots that are included in a workflow or workflows.

According to various embodiments, information about the real facility 202 may be provided by one or more capture devices 210. A capture device may be a robot, a drone, a mobile phone, a dedicated handheld capture device, or any other device capable of capturing information about the real facility 202. The data captured may include visual image data, depth sensor data, LiDAR data, infrared light data, ultraviolet light data, radio frequency ID (RFID) data, or any other type of information capable of being captured by a capture device. For example, a capture device may be a robot that autonomously navigates the real facility 202 and captures data with one or more cameras, depth sensors, and/or LiDAR devices. As another example, a capture device may be a mobile phone or dedicated handheld capture device held by a human as the human walks around the real facility 202.

According to various embodiments, the data engine 206 may be configured to process data received from the integration and configuration system 204, the one or more capture devices 210, and the one or more agents 218. Such information may be stored in the data storage system 208. Additionally, the data engine 206 may be configured to process the data to determine or update the virtual environment 212, the virtual facility 216, and/or analytics provided to the analytics system 214.

In some implementations, as one part of data processing, the data engine 206 may be configured to convert received data into a canonical form as needed for the purpose of storage in the data system 208. For example, the data engine 206 may serialize sensor data 222 such as image data, depth sensor data, and LiDAR data. As another example, the data engine 206 may store log data 224. Log data 224 may include, for instance, semi-structured information produced by agents and robots as they operate in the real facility 202. As yet another example, the data engine 206 may store atomic data 226 such as item locations, robot locations, human locations, monitoring data, key-value data, and/or other such granular information. The log data 224 and/or the atomic data 226 may include various types of information received from the integration and configuration system 204, whereas the sensor data 222 may include primarily data received from the one or more capture devices 210 and/or the one or more agents 218.

According to various embodiments, the agents 218 may include one or more robots, fixed cameras, handheld devices, mobile phones, or other devices that provide information to the data engine 206. In some configurations, one or more of the agents 218 may overlap with one or more of the capture devices 210. However, at least conceptually, the one or more capture devices 210 may be used to initially or periodically capture more granular and comprehensive data from the real facility 202 whereas the one or more agents 218 may provide a less granular and comprehensive but more continuous stream of data. For example, the agents 218 may include a fleet of robots that stream camera data, depth sensor data, and/or LiDAR data to the data engine 206. As another example, the agents 218 may include cameras arranged in fixed locations in the real facility 202 that again stream image data to the data engine 206.

The agents 218 may differ from the observers 228 in that the observers 228 passively generate image data whereas the agents 218 perform more active operations, such as querying the virtual facility 216 for information. Such querying may occur directly or may be conducted via an intermediary such as a robot fleet controller.

According to various embodiments, the data engine 206 may be configured to determine the virtual environment 212 from the various data received at the data engine 206. The virtual environment 212 may be configured as a three-dimensional shell representing the real facility 202, and may be produced using a process that involves photogrammetry, Gaussian splatting, visual simultaneous localization and mapping (vSLAM), and the like. Additional details regarding such a process are discussed with respect to FIG. 3.

In some embodiments, the virtual environment 212 may then be combined with information generated by the integration and configuration system 204 to produce a virtual facility 216. Once created, the virtual environment 212 may mirror the real facility 202. That is, the virtual environment 212 may provide a virtual representation of the physical environment, locations within the physical environment, agents operating within the physical environment, and workflows that may be performed within the physical environment. The locations may include, for instance, the locations of inventory, people, robots, logical regions (e.g., robot exclusion zones), devices, and/or other elements within the physical environment.

In some embodiments, the virtual facility 216 may include a number of layers that collectively represent a state of the real facility 202. For example, the virtual facility 216 may include one or more three-dimensional layers and/or one or more two-dimensional layers that are virtually aligned with one another. As another example, the virtual facility 216 may include one or more base layers that correspond to the virtual environment 212 and represent relatively fixed elements such as walls, shelves, doors, and the like. As another example, the virtual facility 216 may include one or more additional layers that represent location information for robots, items, people, and other elements within the real facility 202. Additional details regarding the creation and updating of the 216 are discussed with respect to FIG. 3.

In some implementations, the virtual environment 212 may be queried to facilitate decision making related to the real facility 202. For example, an agent such as a robot may query the virtual facility 216 to determine information such as a location or map for use in routing. As another example, the integration and configuration system 204 may query the virtual facility 216 to facilitate the selection of a workflow within the real facility 202 to accomplish a specified goal.

In some embodiments, the use of different layers in the virtual facility 216 may help to reduce or eliminate the need of producing a single, internally consistent representation of the physical environment. For instance, one layer that includes a three-dimensional view of the physical environment may show an item on a shelf at a given location. However, another layer that includes a representation of item locations may indicate that the item has already been moved away from that location. The different layers may be inconsistent because, for instance, semantic information received from the integration and configuration system 204 may be out of synchronization with visual information received from the agents 218. However, such inconsistencies may typically be unimportant, since different layers may be used to respond to different types of queries. For instance, in the above example, the three-dimensional view layer may be used to facilitate planning a route from a first location to a second location, while the item representation layer may be used to guide the determination of a workflow that involves picking particular items within the physical environment.

In some embodiments, the data engine 206 and/or the virtual facility 216 may be used to determine analytics for providing to the analytics system 214. The analytics system analytics system 214 may store analytics information and/or provide such information for presentation at a client machine, for instance in a dashboard. The analytics may include any of various types of information, which may be configured based on the particular environment, context, and goals associated with the real facility 202. For instance, the analytics information may include a value such as the average location of robots over a 15-minute period or the average distance traversed by robots when picking an item.

Various types of analytics may be provided. For example, warehouse statistics such as orders fulfilled, warehouse space utilization, number of workers or fleets active, and safety/compliance items may be generated. As another example, robot fleet statistics such as uptime, number of trips/picks per fleet, robots that are active vs. charging vs. down, and robot issues that need attention may be generated.

In some embodiments, the simulator engine 220 may be configured to predict a future state of the real facility 202 or the virtual facility 216 from a present state of the virtual facility 216. For example, the simulator engine 220 may predict updated location information for robots, people, and items based on past and current location information for the robots, people, and items.

In some embodiments, the simulation process may involve generating simulated data. The simulated data may include any or all of simulated sensor data from the one or more agents 218, simulated data from the integration and configuration system 204, and/or simulated data from the one or more capture devices 210. Such simulated data may then be used to generate an updated version of the virtual facility 216. For instance, the system may be configured such that the pipelines for real and simulated data are similar or identical, allowing the virtual facility 216 to be updated using simulated data in the same or much the same way that the virtual facility 216 is generated or updated using real data.

According to various embodiments, the simulation process may be used to generate various hypothetical future versions of the real facility 202. For example, the simulation process may be used to simulate hypothetical workflows, robot fleet configurations, robot configurations, people configurations, analytics information, and more. Such information may aid in the configuration of the real facility 202 as well as in the selection of workflows and the instruction of robots and people within the real facility 202.

Figure 3:
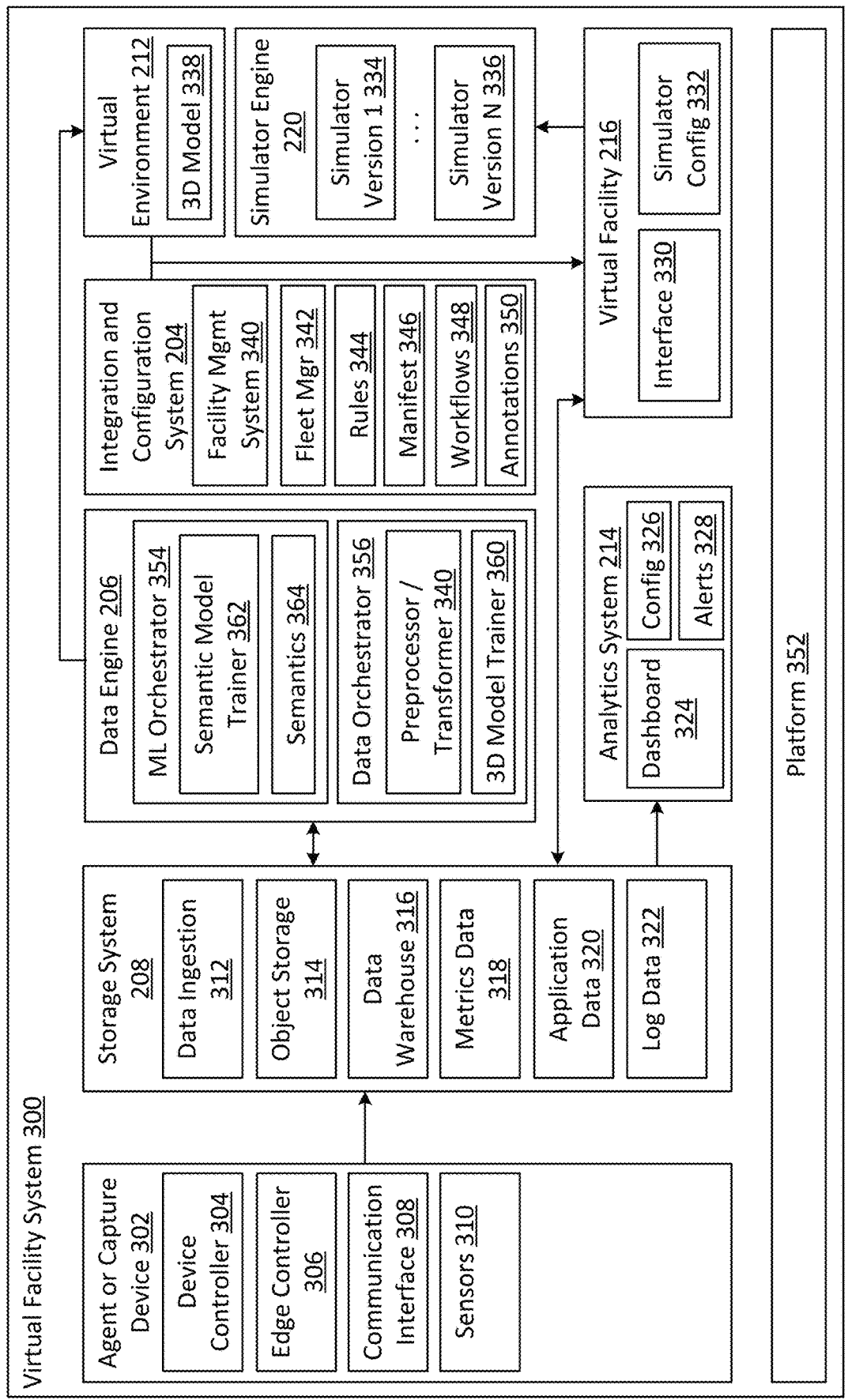
FIG. 3 represents a diagram of a virtual facility robotics system, configured in accordance with one or more embodiments.

FIG. 3 represents a diagram of a virtual facility system 300, configured in accordance with one or more embodiments. The virtual facility system 300 represents a more detailed view of various components included in the virtual facility ecosystem 200. The virtual facility system 300 includes an agent or capture device 302, the storage system 208, the analytics system 214, the virtual facility 216, the simulator engine 220, the virtual environment 212, the integration and configuration system 204, a platform 352, and the data engine 206.

According to various embodiments, the agent or capture device 302 may be any device or devices that exist at the real facility 202 and that are in communication with one or more components of the virtual facility ecosystem 200. For example, the agent or capture device 302 may be a robot, a dedicated handheld capture device, a mobile phone, a fixed camera, or another such device. The agent or capture device 302 includes a device controller 304, an edge controller 306, a communication interface 308, and one or more sensors 310.

According to various embodiments, the device controller 304 may be specific to the type of the agent or capture device. For instance, a robot may include a device controller configured to control the robot, while a mobile phone may include a controller configured to provide a mobile phone operating system. In the case of a robot, the device controller 304 may receive instructions determined based on the virtual facility, such as a route to travel through the physical environment.

According to various embodiments, the sensors 310 may be configured to detect sensor data, which may be conveyed to other elements of the virtual facility ecosystem 200 via the communication interface 308. Examples of sensors may include, but are not limited to, visible light cameras, structured light sensors, depth sensors, LiDAR sensors, RFID sensors, microphones, and infrared cameras.

In some embodiments, some information determined at the agent or capture device 302 may be transmitted via a streaming protocol. For example, data such as events, logs, metrics, and/or some or all of the sensor data may be streamed. Streaming may be conducted via a technology such as Robot Operating System (ROS)/Message Queue Telemetry Transport (MQTT), Web Real-Time Communication (WebRTC), or Teleport tunneling.

In some embodiments, some information determined at the agent or capture device 302 may be transmitted via a batch protocol. For instance, large volumes of sensor data may be transmitted in batches.

In some implementations, the edge controller 306 may perform operations such as receiving and transmitting the sensor data, establishing network connections, and determining when to upload data. For instance, batched data may be uploaded during robot charging to take advantage of the reduced bandwidth normally employed by the robot during such a state.

According to various embodiments, the storage system 208 may include a data ingestion component 312, an object storage component 314, a data warehouse component 316, a metrics data component 318, an application data component 320, and a log data component 322.

In some implementations, the data ingestion component 312 may be a service such as Kafka that is configured to receive and process data from various sources in an event-driven manner. The data ingestion component 312 may receive data from the agent or capture device 302 and/or from other locations such as the integration and configuration system 204. Depending on the type of data, the data ingestion component 312 may store the data in object storage component 314 and/or the data warehouse component 316.

In some embodiments, the object storage component 314 may store raw data available for processing. For instance, the object storage component 314 may be implemented as one or more Amazon S3 or Google Cloud Storage buckets configured to store any of various types of data objects.

In some implementations, the data warehouse component 316 may store more structured data. For instance, the data warehouse component 316 may store data that has been transformed, canonicalized, or otherwise processed. The data warehouse component 316 may include one or more databases such as a Postgres database, a DuckDB database, and/or a PostGIS database.

In some embodiments, the metrics data component 318 may store data values such as metrics that are fully structured. For instance, the metrics data component 318 may be implemented as one or more OpenMetrics instances backed by data storage. The metrics data component 318 may receive data metrics directly from the agent or capture device 302 or may receive data metrics from the data engine 206. The data engine 206 may determine metrics by retrieving data from the data storage system 208 and then processing such data to produce the metrics.

In some implementations, the log data component 322 may include any type of log data received from the agent or capture device 302, the data engine 206, or other components of the virtual facility ecosystem 200.

In some embodiments, the application data 320 may store information related to the execution of one or more components of the 300. For instance, the application data component 320 may store information such as user accounts, application configuration information, and the like.

According to various embodiments, the analytics system 214 includes a dashboard 324, metrics configuration information 326, and an alerts component 328. The dashboard 324 may be configured to communicate with a client machine to present one or more metrics retrieved from the metrics data component 318. The alerts component 328 is configured to transmit one or more messages when a triggering condition related to a metric is met.

According to various embodiments, the data engine 206 includes a machine learning orchestrator 354 and a data orchestrator 356. The data orchestrator 356 may handle operations such as processing and transforming data, generating 3D models, and updating 3D models. The machine learning orchestrator 354 may handle operations such as training machine learning models and performing machine learning model inference workflows.

In some embodiments, the data orchestrator 356 may be configured as an easily scalable subsystem that can adapt to changing workflows for processing and transforming data. For example, the data preprocessor and transformer 358 may monitor the object storage component 314 for new data objects and/or receive data directly from the data warehouse component 316 and/or object storage component 314. Data received from these sources may then be preprocessed and stored to the data storage system 208, such as in the data warehouse component 316 and/or the metrics data component 318.

The data orchestrator 356 includes a model creator 360. According to various embodiments, the model creator 356 may create a 3D model of an environment from images of the 3D environment. For example, viewshed fields for neural radiance fields (NeRFs) may be used to determine a correspondence between points shown in two different scenes. Viewshed fields provide an implicit function that determines the likelihood that a 3D point in a representation is to have been viewed by the cameras that captured the images. The function can then be used to determine an alignment between the scenes in three-dimensional space. However, such an approach is only one possibility of determining a three-dimensional model based on sensor data. Depending on the system configuration and the available sensor data, various configurations are possible. For instance, the availability of depth sensor data may provide for alternative model creation approaches. Additional details regarding the creation of a three-dimensional model are discussed, for example, with respect to FIG. 6, FIG. 7, and FIG. 8.

According to various embodiments, the machine learning orchestrator 354 may perform operations such as model training 362 and semantics operations 364 such as machine learning inference workflows. Model training 362 may be used to train a machine learning model to, for example, generate a photorealistic representation of the real facility 202 based on real and/or simulated data. The semantics operations 364 may include operations such as executing a query to count all of the inventory items present in a region of the virtual facility 216.

According to various embodiments, any of a variety of models may be trained at 362 and executed in an inference phase at 364. For example, custom, facility-specific, perception models may be trained and used to build the virtual facility and tag it with detected semantics of interest such as place semantics (e.g., shelves, barcodes, signs, lane markings, fire hydrants, exits, etc.), object semantics (e.g., boxes, pallets, forklifts or other material handling equipment), or people activity. For any of these semantics a model may be trained in the context of the facility to improve model accuracy.

According to various embodiments, the data engine 206 may generate a 3D model 338. The 3D model 338 may be generated in a manner that is agnostic to the renderer. For example, the 3D model 338 may be a splat model that may be rendered via any of browser-based renderers such as one built on WebAssembly or native applications such as the Unreal Engine or the Unity Engine.

According to various embodiments, the integration and configuration system 204 may include components such as a facility management system interface 340, a fleet manager interface 342, a rules repository 344, a manifest information repository 346, a workflow information repository 348, and an annotations interface 350.

In some embodiments, a facility management system interface 340 may serve as an interface to a system for managing the 202, such as a warehouse management system. The facility management system may provide access to information such as inventory item locations, inventor orders, packages to be shipped, inventory replenishment, facility personnel roles and assignments, and other such facility-specific data.

In some implementations, the fleet manager interface 342 may provide access to one or more fleet manager systems for managing one or more fleets of robots operating with the real facility 202. For example, the fleet manager interface 342 may perform operations such as determining workflows for the robots, sending instructions to the robots, and receiving telemetry data from the robots.

In some embodiments, the rules repository 344 may store information about rules governing the real facility 202. Various types of rules may be supported. For instance, rules may specify locations where robots cannot travel, lane directionality, charging zones, other zones of interest, maximum robot or equipment speeds associated with certain locations, minimum clearance distances, rules governing interactions between robots and humans, and/or other such information pertaining to facility compliance.

In some embodiments, the manifest information repository 346 may store information about the configuration of robots within the real facility 202. Examples of such configuration information may include, but are not limited to, sensors available at the robots, machine learning models deployed to the robots, physical models of the robots, calibration information for the robots, and numbers and types of robots.

According to various embodiments, the workflow information repository 348 may include information characterizing predetermined process and workflows that may be executed at the real facility 202. For instance, a workflow may include one or more actors such as robots and/or humans, one or more objectives, information for determining one or more paths to be traveled, and/or one or more operations to be performed.

In some implementations, the annotations interface 350 may be used to provide additional input for refining the virtual facility 216. For instance, images of forklifts operating in the real facility 202 may be provided along with a label to facilitate training a machine learning model to recognize forklifts as such when they appear in image data used to construct the virtual facility 216.

In some implementations, the metrics configuration information 326 may store configuration information for the analytics system. For example, the metrics configuration information 326 may indicate which metrics are to be collected, how metrics are defined, and/or which metrics are to be displayed in the dashboard 324. As another example, the metrics configuration information 326 may include information about alerts such as a triggering condition for an alert, a recipient for an alert message, and/or information to be included in an alert message.

According to various embodiments, the virtual facility 216 includes a virtual facility interface 330. The virtual facility interface 330 is configured to receive information for creating and updating the virtual facility 216. For instance, the interface 330 may receive 3D model information from the virtual environment 212 and may receive facility configuration information from the integration and configuration system 204. The virtual facility interface 330 may also be configured to retrieve information from the data storage system 208 and write information to the data storage system 208. For instance, the virtual facility interface 330 may retrieve information for including in one or more layers of the virtual facility 216 and may store data such as a state of the virtual facility 216 at a point in time.

According to various embodiments, the virtual facility 216 also includes simulator configuration information 332. The simulator configuration information 332 may include one or more parameters for configuring the simulator engine 220. Such information may include information used to update a simulated state of the virtual facility 216, such as prospective location information for one or more people, robots, items, and/or other elements of the real facility 202. Examples of simulator configuration information 332 may include, for instance, the types of data values to simulate, a simulator version to employ for generating the simulated value, information to provide as input to the simulator version, a length of time for which to run the simulator, and the like.

According to various embodiments, the simulator engine 220 may include various simulator versions, such as the simulator version 1 334 through the simulator version N 336. Different simulator versions may be used for simulating various types of data. For example, a simulator may be configured using the Unreal Engine or the Unity Engine to provide a simulation with high photorealism. Such a simulation may be useful when generating photorealistic data for testing a visual navigation algorithm on a robot but may have relatively high compute costs and time. As another example, a simulator may be configured with a linear velocity model and graph for simulating values such as a rough estimate of throughput and may be producible using relatively lower compute cost and time.

According to various embodiments, different simulators may be configured to output data for presentation in different rendering engines. For example, one simulator version may be configured to output data for presentation in a native application such as the Unreal Engine or the Unity Engine. As another example, another simulator version may provide data for a browser-based renderer such one built on WebAssembly or other in-browser game engines.

According to various embodiments, the simulator engine 220 may employ more than one simulator version in concert. For example, the simulator engine 220 may employ a low-resolution, low-cost simulator to simulate various alternative future states of the virtual facility 216. Then once a particular future state is selected, the data output from the low-resolution, low-cost simulator may be provided as input to a high-resolution, high-cost, photorealistic simulator to generate visual output in high resolution.

According to various embodiments, the platform 352 includes one or more software and/or hardware components for providing the various elements of the virtual facility system 300. For example, the platform 352 may include computing devices arranged across one or more on-premises, first-party, and/or cloud computing systems. As another example, the platform 352 may include one or more applications such as object storage repositories, key-value stores, database systems, application servers, communication interfaces, machine learning models, and/or other types of applications.

According to various embodiments, the model training 362 may train semantic models such as those used to detect semantics in a scene. In contrast, the model creator 360 may be configured to train a 3D neural renderer of the virtual facility. Semantics detected by the semantics models trained at 362 may be registered in the 3D renderer created via the model creator at 360.

Figure 31:
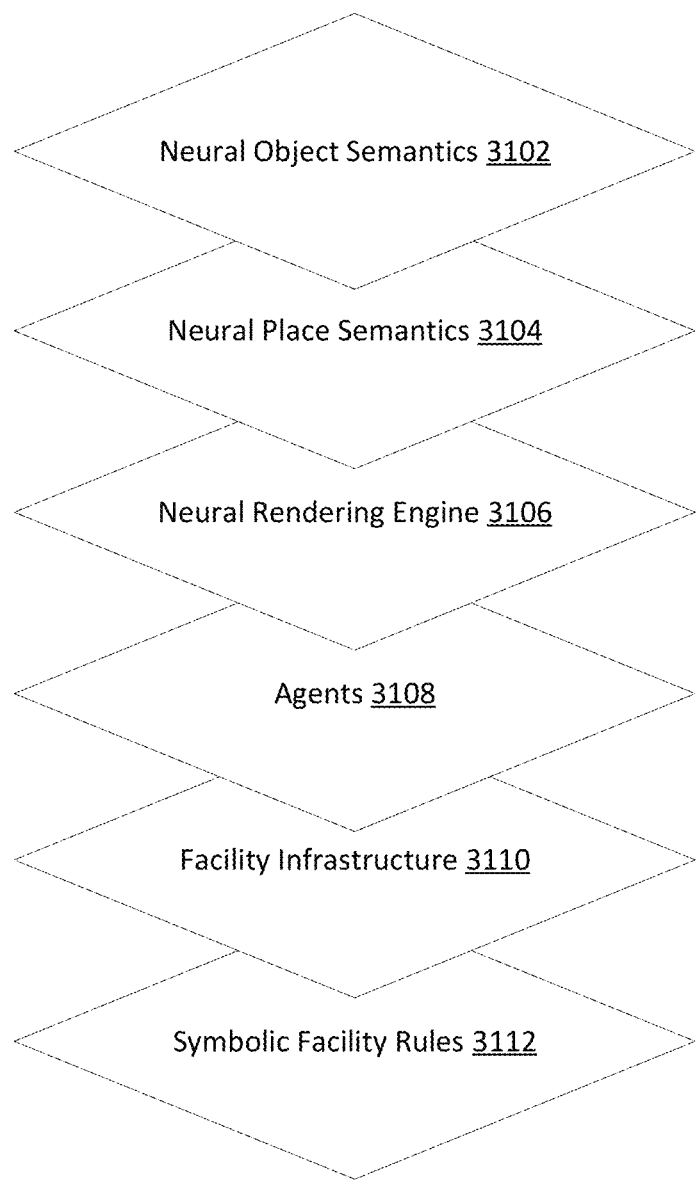
FIG. 31 illustrates a diagram of a virtual facility layer representation, configured in accordance with one or more embodiments.

FIG. 31 illustrates a diagram of a virtual facility layer representation, configured in accordance with one or more embodiments. According to various embodiments, the layers shown in FIG. 31 may correspond to different elements of the virtual facility Collectively, the components shown in FIG. 2 and FIG. 3 may coordinate to generate the virtual facility 216 that includes one or more layers, which may be configured substantially as illustrated in FIG. 31.

According to various embodiments, the neural object semantics layer 3102 may include information characterizing locations of objects positioned within the virtual facility. Such objects may be positioned by performing object recognition using an object perception model trained on image data, for instance via the model trainer 362.

In some embodiments, the neural place semantics layer 3104 may include information characterizing locations of semantically meaningful places within the virtual facility, such as doors, shelves, and the like. Such objects may be positioned by performing place recognition using a place perception model trained on image data, for instance via the model trainer 362.

In some embodiments, the neural rendering engine 3106 may include information for generating a simulated three-dimensional representation of the virtual facility. The neural renderer may be trained based on image data captured from the real facility, for instance via the model creator 360.

In some embodiments, the agents layer 3108 may include information characterizing the location of one or more agents within the virtual facility. Such information may be determined from a variety of types of input, such as telemetry data from agents, image data that includes images of agents, facility workflow data that includes location information for agents, and/or other data sources.

In some embodiments, the facility infrastructure layer 3110 may include information such as inventory or materials locations, workflows, or other such data regarding the operations of the facility. Such information may be received from one or more elements of the integration and configuration system 204.

In some embodiments, the symbolic facility rules layer 3112 may include location information for one or more rules applied to the virtual facility. Such rules may include rules related to no-go zones, forklift lanes, maximum travel speeds, lane directionality, exclusion zones, egress markings, lane markings, exclusion zones markings, presence of objects, and absence of objects and the like.

In some embodiments, the layers may be coordinated in the sense that a location in one layer may correspond directly to a location in another layer. For example, an agent such as a robot or person located within the agents layer 3108 may be positioned at a designated location within the agents layer. However, because the layers are parameterized using a consistent coordinate system, the agent's location may correspond to the same location within the neural rendering engine 3108. In this way, the neural rendering engine can generate sensor data from the agent's perspective and/or can generate a simulated three-dimensional representation of the real facility that includes a depiction of the agent.

According to various embodiments, a virtual facility may include layers not shown in FIG. 1. Similarly, not all of the layers shown in FIG. 31 need be present in every virtual facility.

Figure 4:
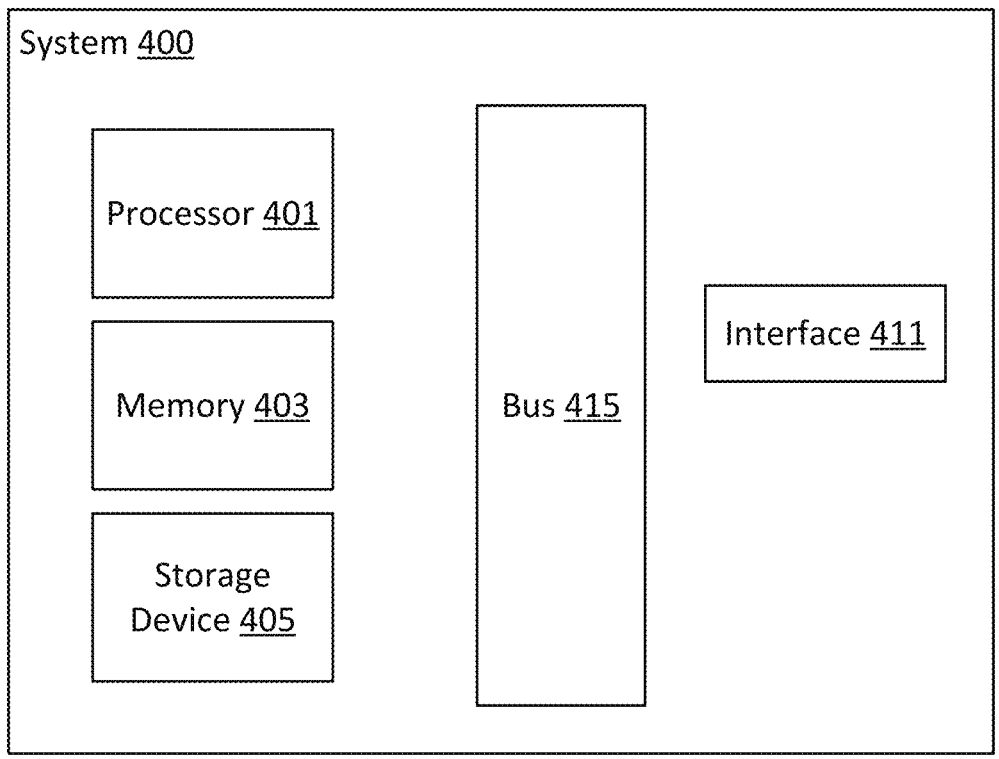
FIG. 4 illustrates a computing device, configured in accordance with one or more embodiments.

FIG. 4 illustrates one example of a computing device. According to various embodiments, a system 400 suitable for implementing embodiments described herein includes a processor 401, a memory module 403, a storage device 405, an interface 411, and a bus 415 (e.g., a PCI bus or other interconnection fabric.) System 400 may operate as variety of devices such as an agent, a robot, a capture device, a data engine, or any other device or service described herein. Although a particular configuration is described, a variety of alternative configurations are possible. The processor 401 may perform operations such as those described herein. Instructions for performing such operations may be embodied in the memory module 403, on one or more non-transitory computer readable media, or on some other storage device. Various specially configured devices can also be used in place of or in addition to the processor 401. The interface 411 may be configured to send and receive data packets over a network, for instance via Ethernet. These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 5:
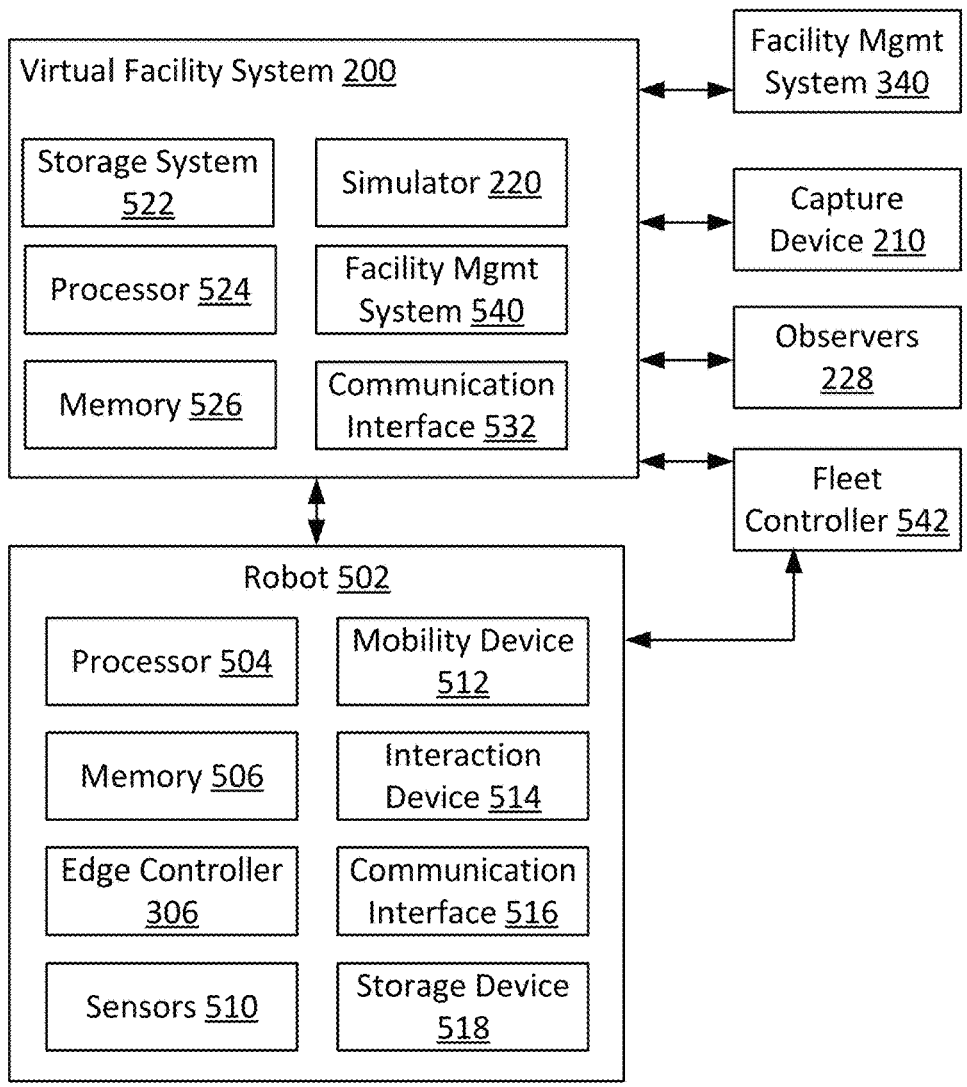
FIG. 5 illustrates an example of a robotics system, configured in accordance with one or more embodiments.

FIG. 5 illustrates an example of a robotics system 500, configured in accordance with one or more embodiments. The robotics system 500 may be used to perform one or more operations discussed herein. The robotics system 500 includes a virtual facility system 520 in communication with a robot 502, a warehouse management system 530, and the capture device 210. Although for simplicity FIG. 5 illustrates only one instance of each device, a system configured in accordance with techniques and mechanisms described herein may feature various numbers and configurations of devices and components. Moreover, one or more of the components shown in FIG. 5 may overlap with one or more of the components illustrated in FIG. 2, FIG. 3, and/or FIG. 4.

The robot 502 includes a processor 504, memory 506, an edge controller 306, a sensor 510, a mobility device 512, an interaction device 5124, a communication interface 516, and a storage device 518. According to various embodiments, the edge controller 306 may facilitate communications between the robot 502 and the virtual facility system 520. For instance, the edge controller 306 may help to share data between the robot and the virtual facility system 520, send queries and receive responses related to the photorealistic and physically realistic simulated 3D model of the physical environment, and/or perform other such actions.

In some embodiments, the robot 502 may include any of various combinations of various types of sensors. For example, the robot 502 may include one or more 2D cameras, 3D cameras, LiDAR sensors, structured light sensors, depth sensors, RFID readers, geolocation devices, accelerometers, and/or any other type of sensor.

According to various embodiments, the mobility device 512 may include one or more wheels, treads, legs, and/or any other mechanism for robotic locomotion. Similarly, the interaction device 514 may include one or more display screens, robotic arms, suction devices, conveyer belts, and/or any other mechanism for physically interacting with and/or providing information to the external environment.

According to various embodiments, the storage device 518 may store information such as programming language instructions facilitating autonomous operation of the robot 502.

The virtual facility system 520 includes a storage device 522, a processor 524, memory 526, and the simulator engine 220, and a communication interface 523. Additionally, the virtual facility system 520 may include one or more of the components illustrated in FIG. 2, FIG. 3, and/or FIG. 4. According to various embodiments, the simulator engine 220 may generate, update, maintain, and employ a photorealistic and physically realistic 3D simulated model of one or more physical environments. Sensor data for generating the model may be received from one or more robots such as the robot 502 and/or one or more other devices such as the capture device 210. Examples of such external devices may include, but are not limited to, mobile phones, dedicated handheld sensor systems, fixed position cameras or other sensors, and the like.

According to various embodiments, the facility management system 340 may coordinate warehouse operations. For example, the facility management system 340 may track inventory quantity and/or logical location. As another example, the facility management system 340 may execute command and control functionality, such as identifying which items should be moved to which locations to achieve a desired goal.

Virtual Facility Creation and Updating

Figure 6:
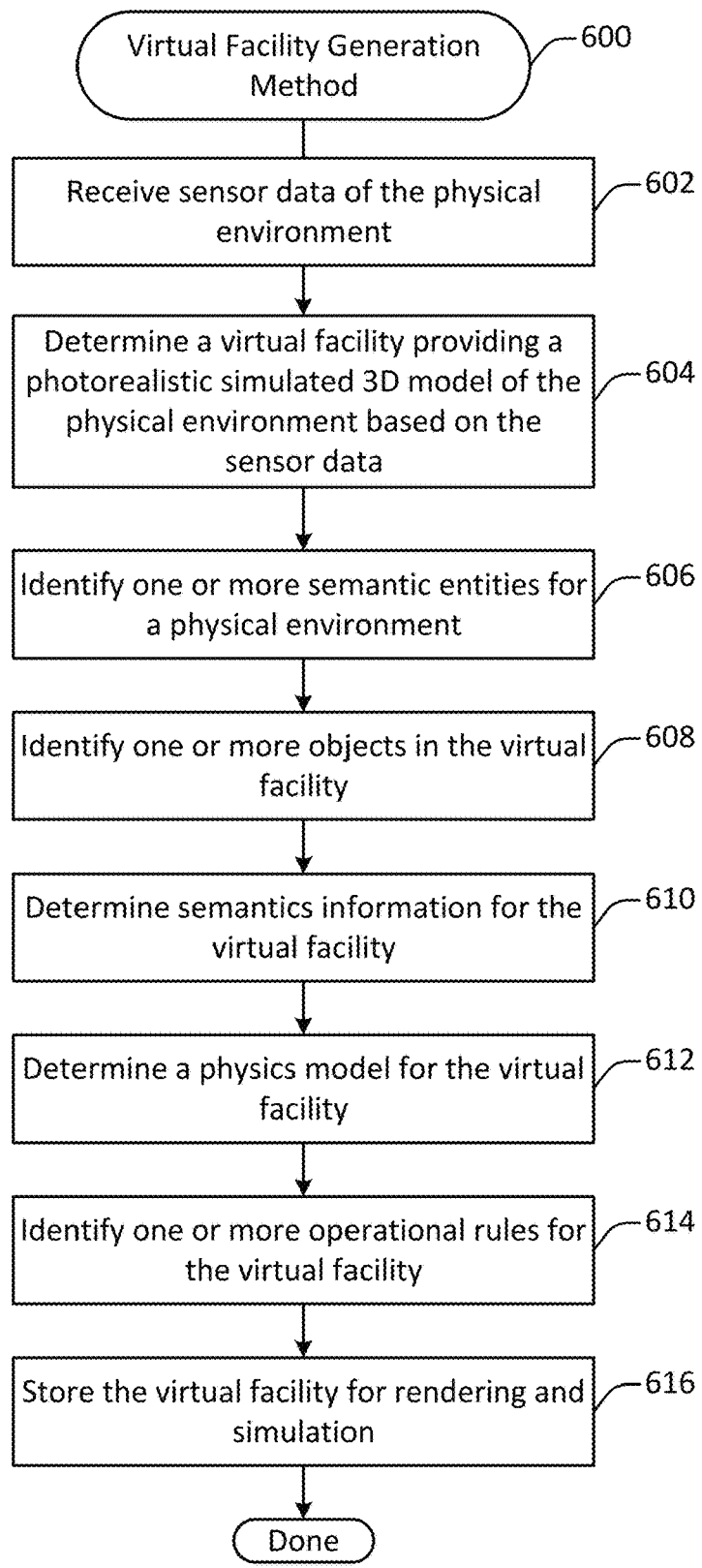
FIG. 6 illustrates a method for generating a virtual facility, performed in accordance with one or more embodiments.

FIG. 6 illustrates a method 600 for generating a virtual facility, performed in accordance with one or more embodiments. The virtual facility may provide for the rendering of a photorealistic and physically realistic simulated 3D model, performed in accordance with one or more embodiments.

In some embodiments, the method 600 may be performed in any suitable computing device, such as cloud computing system or a local computing system. For instance, the method 600 may be performed at the virtual facility system 300 shown in FIG. 3.

Sensor data of the physical environment is received at 602. According to various embodiments, any of various types of sensor data may be received, depending on the available sensors. Examples of sensor data may include, but are not limited to, 2D camera data, 3D camera data, LiDAR data, structured light data, depth sensor data, accelerometer data, geolocation data, and the like.

A virtual facility providing a photorealistic and physically realistic simulated 3D model of the physical environment is determined at 604 based on the sensor data. In some embodiments, the virtual facility may be determined at least in part using generative AI such as one or more neural radiance field (NeRF) neural renderer. For example, a generative AI program may be provided with some or all of the sensor data, such as image data. The generative AI program may then use that information to generate an initial photorealistic simulated 3D model of the environment.

In some embodiments, the virtual facility may be rendered in an engine configured for providing a 3D environment. For instance, the virtual facility may be rendered in an engine such as the Unreal Engine or the Unity Engine.

One or more semantic entities for the physical environment are identified at 606. In some embodiments, one or more semantic entities may be determined based on analyzing the sensor data, for instance via object recognition as discussed with respect to operation 608. Alternatively, or additionally, one or more semantic entities may be predetermined.

According to various embodiments, the semantic entities may depend on the type of environment being modeled. For example, a warehouse environment may include semantic entities such as forklifts, pallets, emergency exits, bins, and the like.

One or more objects in the virtual facility are identified at 608. In some embodiments, object recognition may be performed by customizable computer vision machine learning models. Such techniques may be similar to those employed by robots to detect objects, equipment, people, and other features.

Semantics information for the photorealistic and physically realistic simulated 3D model is determined at 610. In some embodiments, the semantics information may be determined by mapping one or more objects identified at operation 608 to one or more semantic entities identified at 606. For instance, a warehouse may include a forklift as a semantic entity, and object recognition may be used to identify an object in the environment as a forklift.

According to various embodiments, objects recognized in the environment and linked with semantic information may include free-standing objects such as forklifts, pallets, boxes. Objects may also include aspects of the environment itself (i.e., place semantics) such as doors, aisles, racks, and docks. Additionally, identifiers such as barcodes may be scanned and used to link locations in the physical environment and corresponding virtual facility with locations in a warehouse management system or other controller infrastructure.

A physics model is determined for the virtual facility at 612. In some embodiments, the physics model may be determined at least in part based on one or more simultaneous localization and mapping (SLAM) models that allow the mapping of an environment. Such models may be augmented by depth sensor data and/or 3D point cloud information received at 602.

In some embodiments, the physics model may be determined at least in part based on the semantics information determined at 610. For instance, an object in the virtual facility may be identified as a forklift and linked to semantics information about forklifts at 610. The semantics information may then be used to define physics information about the forklift. The physics information may be used to predict future states of the environment, for instance based on actions taken by a robot.

One or more operational rules for the virtual facility are identified at 614. According to various embodiments, operational rules may define guidelines or restrictions for robots operating and traversing the environment. For example, operational rules may include no-go zones, forklift lanes, maximum travel speeds, and the like. As another example, operational rules may include rules related to lane directionality, exclusion zones, egress markings, lane markings, exclusion zones markings, presence of objects, and absence of objects and the like.

Rules may be reflected in a layer within the virtual facility.

In some embodiments, one or more operational rules may be determined based on analyzing the environment, for instance by identifying features such as aisles and loading areas. For instance, a demarcated area that includes one or more parked forklifts may be identified as a forklift parking area. Alternatively, or additionally, one or more operational rules may be predetermined or specified based on user input.

The virtual facility is stored at 616. The stored virtual facility may provide a rich world model which may be used for a variety of purposes. For example, the virtual facility may be used to simulate a robot's sensor data. As another example, the virtual facility may be used to simulate interactions between a robot and the environment or other robots. As another example, the virtual facility may be continually updated based on additional sensor data, such as image and/or point cloud data collected by robots. As still another example, the virtual facility may be used to model live interactions by physical robots operating in the environment, for instance by providing an interface between a warehouse execution system and one or more robots operating in a warehouse.

According to various embodiments, the virtual facility provides a high-fidelity digital representation that captures physical characteristics and semantics of the real facility. Updated localization maps, landmarks, and features may then be shared across different robots and handheld devices. In this way, the system may provide a correspondence across human, robot, and warehouse management system representations of an environment.

Figure 7:
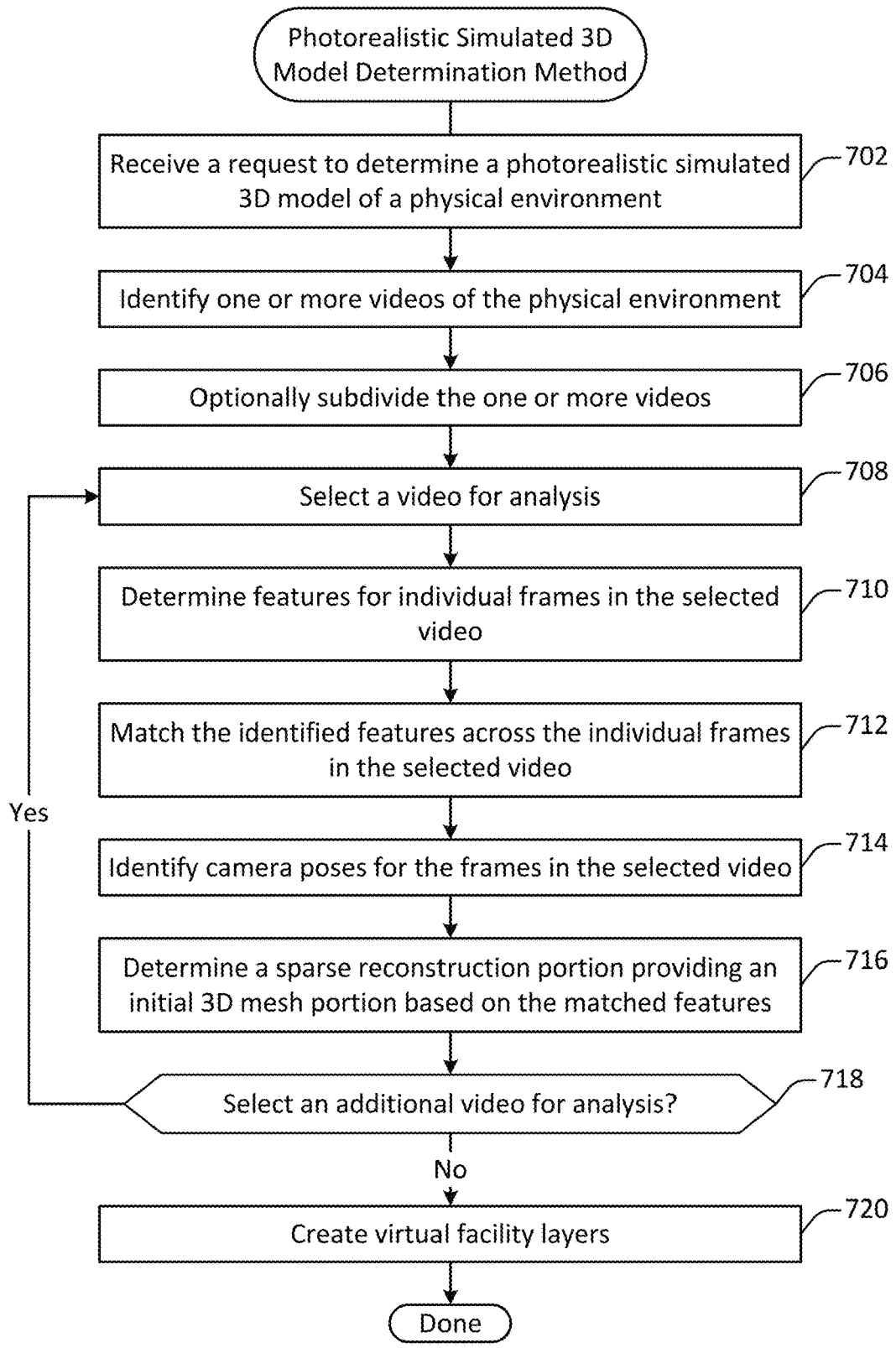
FIG. 7 illustrates a method for determining a photorealistic three-dimensional model of a physical environment, performed in accordance with one or more embodiments.
Figure 8:
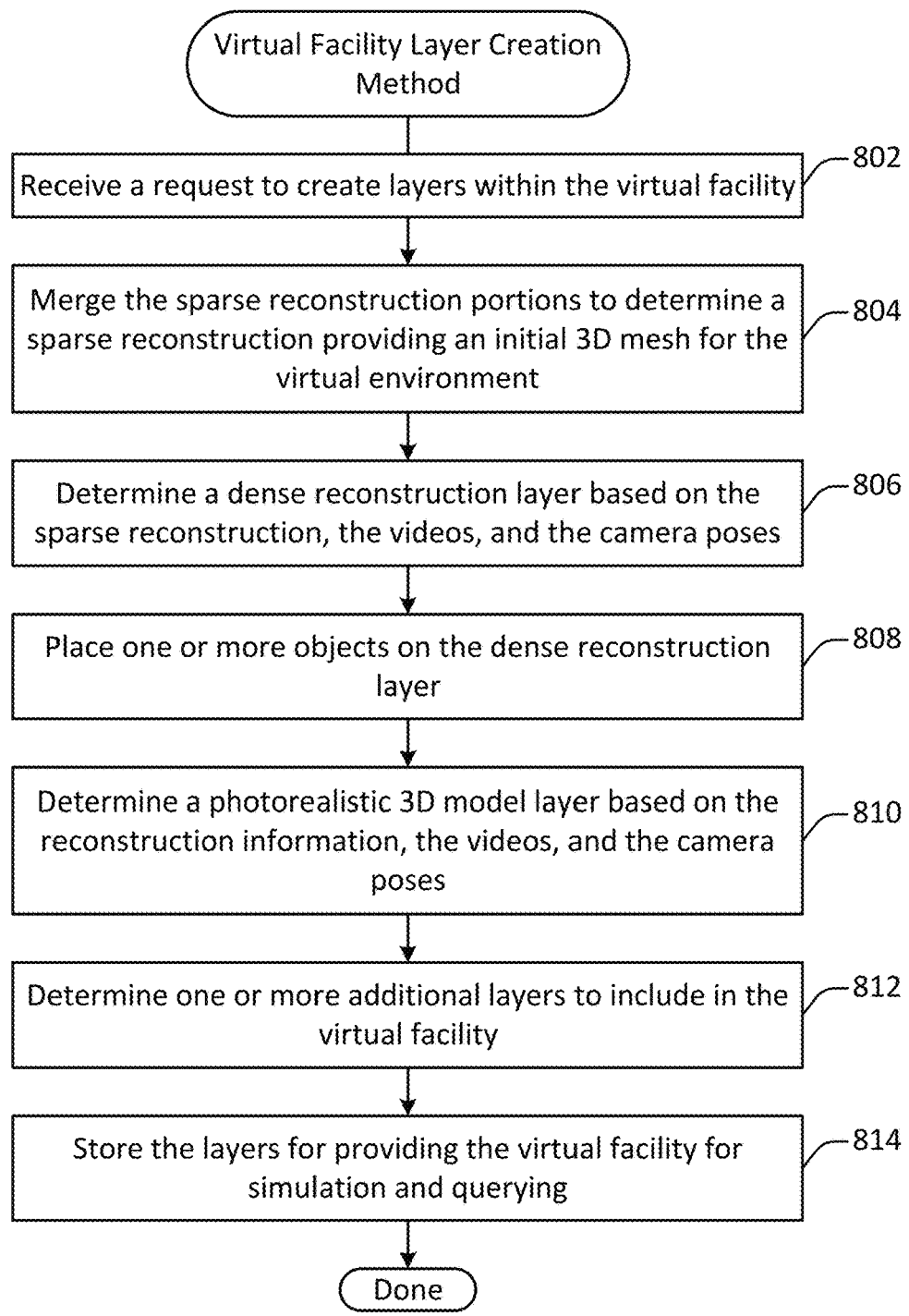
FIG. 8 illustrates a method for determining layers within the virtual facility, performed in accordance with one or more embodiments.

Although FIG. 6, FIG. 7, and FIG. 8 are described in the context of generating a virtual facility, in practice such methods may also be used for updating a virtual facility. For example, robots may collect additional data in the course of their operation, such as additional visual data collected via their sensors. Such data may be stored in the data storage system 208 and used to update the virtual facility 216 to reflect changes to the real facility 202. For instance, the model training process 362 may receive the additional data for retraining the model to provide a new version of the 3D model 338.

FIG. 7 illustrates a method 700 for determining a photorealistic three-dimensional model of a physical environment, performed in accordance with one or more embodiments. The method 700 may be performed in any suitable computing device, such as cloud computing system or a local computing system. For instance, the method 700 may be performed at the virtual facility system 300 shown in FIG. 3.

A request to determine a photorealistic simulated 3D model of a physical environment is received at 702. In some embodiments, the request may be generated as discussed with respect to operation 604 shown in FIG. 6.

One or more videos of the physical environment are identified at 704. In some embodiments, videos may be taken of various areas of the real facility 202. Many facilities are large, including potentially hundreds of thousands of square feet. Accordingly, different videos may be captured of different portions of the facility and/or by different devices. Such videos may then be analyzed to produce a comprehensive representation of the real facility 202.

In some embodiments, such videos may be created by the agent or capture device 302. For example, a robot may autonomously navigate the real facility 202 while capturing video. As another example, a human may navigate the real facility 202 while capturing video with a mobile phone or dedicated capture device.

In some implementations, a video may include information other than video data. For example, a video may include depth sensor information, point cloud data, LiDAR data, or other such supplemental information. Such supplemental data may aid in the determination of feature data from the video.

The one or more videos are optionally subdivided at 706. In some implementations, subdividing videos may be performed for any of various purposes. For example, a long video may be subdivided to aid in parallelization of video processing.

In some embodiments, when a video is subdivided, the video may be divided based on time. For instance, a video may be divided into increments of one minute or another suitable length. Alternatively, a video may be subdivided based on divisions in the environment, such as for different aisles in a warehouse.

In some implementations, when a video is subdivided, successive portions of the video may include overlapping footage. For example, when subdividing a video into two portions, the end of the first portion may overlap with the beginning of the second portion. In this way, the system may more easily determine a correspondence between features represented in the sparse reconstruction portions created from the two videos.

A video is selected for analysis at 708. According to various embodiments, the videos may be analyzed in any suitable order and may be analyzed in sequence or in parallel.

Features for the individual frames in the selected video are determined at 710. According to various embodiments, features may be matched using a scale-invariant feature transform (SIFT), a speeded-up robust feature transform (SURF), or another such feature detector. For example, features such as corner points may be identified as edges with gradients in multiple directions, while edges may be identified as having gradients in two directions The identified features are then matched across the frames at 712. In some embodiments, the identification and matching of features may involve a structure-from-motion analysis. The features identified at 710 may be tracked from one image to the next based on characteristics such as their locations in the frames and their locations relative to each other. For example, a tracker such as the Lucas-Kanade tracker may be used to match the features.

In some embodiments, features may be matched from frames that are temporarily near one another, but not matched from frames that are temporarily far from one another. In this way, the sequence information from the succession of frames may be used to determine the sparse representation of the space represented in the frames.

In some embodiments, an initial matching of features may be filtered to reduce the incidents of incorrect matches. For example, an algorithm such as random sample consensus (RANSAC) may be used to remove outlier correspondences.

Camera poses for the frames in the selected video are identified at 714. In some embodiments, a camera pose for a frame may provide a spatial relationship of the camera at the time of image capture to the content of the frame. For example, a camera pose may identify location coordinates (e.g., x, y, z) of the camera within the 3D space. In some configurations, a camera pose may include additional coordinates, such as those corresponding to roll, yaw, and pitch. Thus, a camera pose may have up to six degrees of freedom.

According to various embodiments, any of various approaches may be used to identify camera poses. For example, in incremental structure-from-motion, camera poses may be solved for individually. As another example, in global structure-from-motion, multiple camera poses may be solved for at the same time. As yet another example, in out-of-core structure-from-motion, several partial reconstructions may be computed and then integrated into a global solution for the video.

A sparse reconstruction portion providing an initial 3D mesh portion based on the matched features is determined at 716. In some embodiments, the sparse reconstruction portion may include the features identified in the video frames represented in three-dimensional space based on the matching determined at 712. That is, the correspondences between features across different frames may facilitate the situation of the features in three-dimensional space in the same way that stereoscopic vision provides depth information to the viewer.

A determination is made at 718 as to whether to select an additional video for analysis. According to various embodiments, additional videos may continue to be selected until all videos identified at 718 and optionally subdivided at 706 have been analyzed.

Upon determining not to select an additional video for analysis, the virtual facility is created at 720 as a set of layers. For example, sparse reconstruction portions may be merged. As another example, a photorealistic three-dimensional model may be created. As yet another example, one or more dynamic elements such as forklifts or robots may be added to the virtual facility. Additional details regarding the creation of the layers are discussed with respect to the method 800 shown in FIG. 8.

FIG. 8 illustrates a method 800 for determining layers within the virtual facility, performed in accordance with one or more embodiments. The method 800 may be performed in any suitable computing device, such as cloud computing system or a local computing system. For instance, the method 800 may be performed at the virtual facility system 300 shown in FIG. 3.

A request to determine a photorealistic simulated 3D model of a physical environment is received at 802. In some embodiments, the request may be generated as discussed with respect to operation 720 shown in FIG. 7.

The sparse reconstruction portions are merged at 804 to determine a sparse reconstruction for the virtual facility as a whole. The sparse reconstruction may provide an initial 3D mesh for the virtual environment. According to various embodiments, merging the sparse reconstruction portions may involve matching features represented in the different sparse reconstruction. Such matching may involve one or more of a variety of approaches, such as those discussed in the following paragraphs.

In some embodiments, images from one video may be included in the input data for along with images from a second video. For example, after performing feature detection to generate latent representations for each of the images, images from different videos may be matched based on the similarity of their features. In this way, the overlap between the two videos may be strengthened, which may facilitate stronger matching.

In some embodiments, a capture device may generate rich data to facilitate stronger matching. For example, a capture application may provide video creation time, pose estimation, depth measurement, and other such data along with image data. As another example, a capture application may generate a point cloud in a 3D space. As yet another example, a visual SLAM may be conducted at the capture application, for instance to help determine an orientation of the camera relative to the environment. Such information may provide additional context that sheds light on the spatial relationship between images selected from one video and images selected from another video.

A dense reconstruction layer is determined at 806 based on the sparse reconstruction, the videos, and the camera poses. According to various embodiments, the dense reconstruction layer may be similar to the sparse reconstruction in the sense that it includes a point cloud but be different in that the dense reconstruction includes many more points in the 3D space. The dense reconstruction layer may be created by filling in the sparse reconstruction with additional points determined based on the correspondence between the sparse reconstruction points and the images, along with the estimated pose information for the images.

One or more objects are placed on the dense reconstruction layer at 808. In some embodiments, the locations of the one or more objects may be determined by retrieving such information from the data storage system 208. For instances, the data storage system 208 may store information indicating the location of various dynamic elements of the real facility 202 over time.

A photorealistic 3D model layer is determined at 810 based on the reconstruction information, the videos, and the camera poses. In some embodiments, the photorealistic 3D model layer may be determined by a Gaussian splat process in which sparse points from the spare reconstruction and the camera poses are used as input to represent the facility as a radiance field parameterized by a deep neural network. The deep neural network may predict a volume density and view-dependent emitted radiance given the spatial location and viewing direction of the camera. An image can then be produced by sampling many points along camera rays. However, other approaches for generating the photorealistic 3D model layer may also be used.

Once created, the photorealistic 3D model layer determined at 810 and the dense reconstruction determined at 806 may serve complementary purposes. For instance, the photorealistic 3D model layer may provide relatively high visual fidelity but relatively low structural, physical, and interactive fidelity. In contrast, the dense reconstruction may provide relatively low visual fidelity but relatively high structural, physical, and interactive fidelity.

One or more additional layers to include in the virtual facility are determined at 812. In some embodiments, the one or more additional layers may include information determined based on integration and configuration data. For example, the one or more additional layers may indicate logical regions such as zones that are off limits to robots or that are associated with robot recharging. As another example, the one or more additional layers may indicate locations associated with inventory items. As another example, the one or more additional layers may indicate workflow-related information such as areas designated for robot queuing. Such information may be retrieved from the data storage system 208.

According to various embodiments, a layer may be implemented in two or three dimensions. For example, a photorealistic 3D model layer and a dense reconstruction layer may each be implemented in three dimensions. As another example, a robot location telemetry layer or a layer representing regions of the facility associated with workflows or rules may be implemented in two dimensions.

The layers for providing the virtual facility are stored at 814 for simulation and querying. Because the layers are stored separately, different layers and combinations of layers may be used for different applications, such as generating sensor data from a given perspective, predicting analytics in various types of situations, and/or selecting between various alternative workflows.

According to various embodiments, one or more of the operations shown in FIG. 7 and FIG. 8 may be performed in an order different from that shown. For example, the dense reconstruction layer may be determined after, or in parallel with, the determining of the photorealistic 3D model layer. As another example, one or more of the dense reconstruction layer and the photorealistic 3D model layer may be determined on a per-video basis in FIG. 7, with those layers then being merged to create facility-wide layers in FIG. 8.

Virtual Facility Applications

Figure 9:
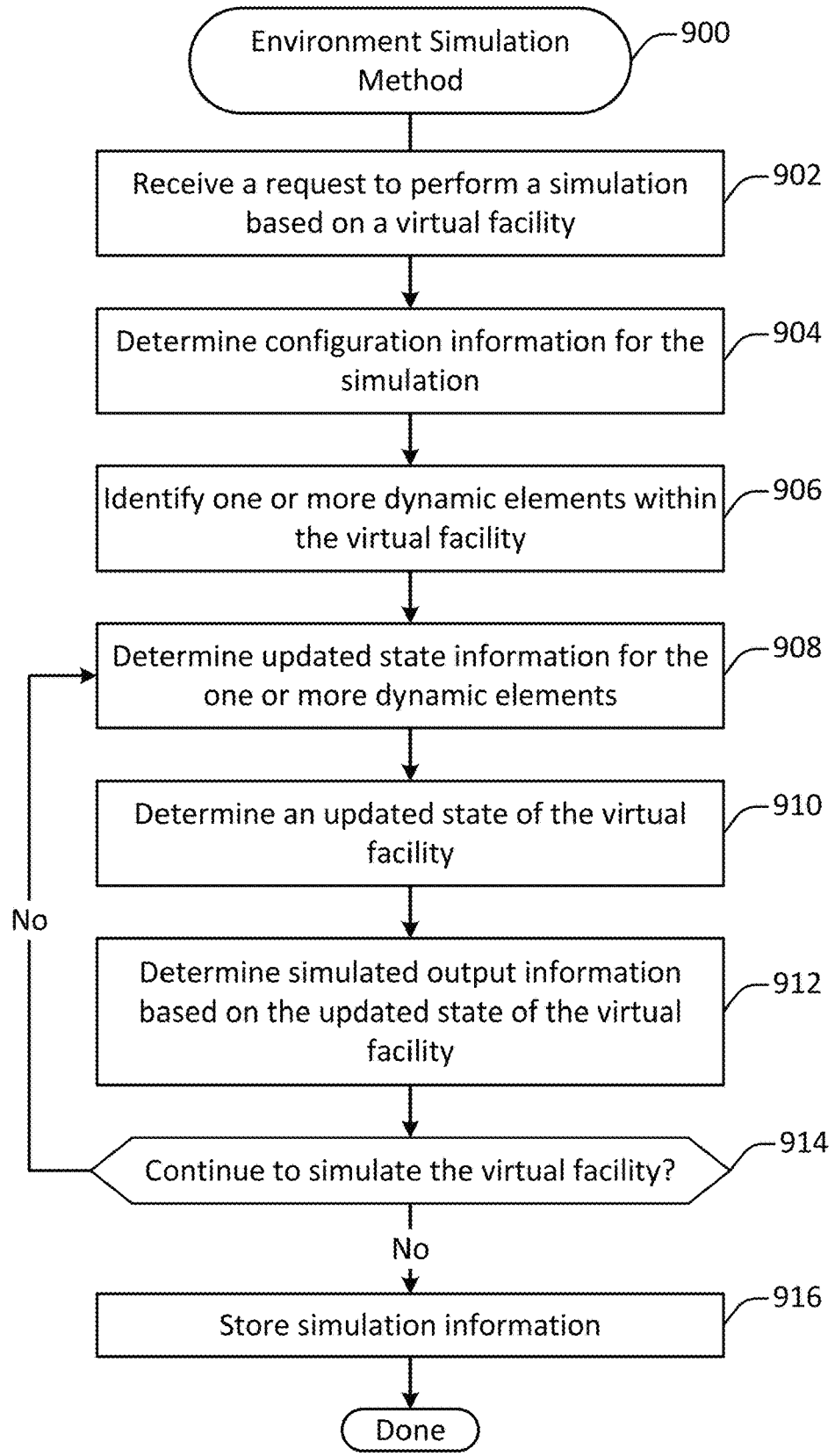
FIG. 9 illustrates a method for simulating a future state of a virtual facility, performed in accordance with one or more embodiments.

FIG. 9 illustrates a method 900 for simulating a future state of a virtual facility, performed in accordance with one or more embodiments. The method 900 may be performed at the simulator engine 220 shown in FIG. 2.

A request to perform a simulation based on a virtual facility is received at 902. Such a request may be received at the simulator engine 220. According to various embodiments, such a request may be received from a client machine or from another component of the virtual facility system 300.

According to various embodiments, the request may be received in any of a variety of contexts and to support any of a variety of applications. For example, the method 900 may be performed to simulate the performance a robot within the real facility 202, to simulate the performance of a new workflow within the real facility 202, to generate training data for a robot intended for operation within the real facility 202, to test various possible courses of actions for robots and/or humans within the real facility 202, and/or for many other possible purposes.

Configuration information for the simulation is determined at 904. In some embodiments, the configuration information may be specified as discussed with respect to the simulator configuration information 332 shown in FIG. 3.

According to various embodiments, the configuration information may include any of various types of information. Examples of such information may include, but are not limited to: a length of time for running the simulation, a triggering condition for terminating the simulation, data to generate as part of running the simulation, layers or other information from the virtual facility 216 to include in the simulation, one or more actors to include in the simulation, one or more workflows or processes to simulate, and/or any other information for initializing or executing the simulation.

In some embodiments, the simulation configuration information may specify a robot actor traveling along a path. The simulation configuration information may also specify additional data for the robot actor, such as a location and type of the simulated robot's simulated sensors and an instruction to collect data for those simulated sensors. For instance, the sensor data may be collected from the simulated position of the robot's sensor or sensors as the robot travels along the path.

In some embodiments, the simulation configuration information may specify a workflow or other course of action that involves one or more humans and/or one or more robots, and one or more performance metrics to collect based on the workflow. For instance, the simulation configuration information may define a simulation to determine an estimated item throughput rate for a hypothetical workflow.

In some embodiments, the configuration information may be determined based on user input. Alternatively, or additionally, the configuration information may be determined automatically, for instance by situating the simulated robot at random, predetermined, and/or selected locations in the virtual facility.

One or more dynamic elements within the virtual facility are identified at 906. According to various embodiments, the dynamic elements may include simulated humans, robots, or items, the location or state of which may change as a consequence of running the simulation. One or more such elements may be identified from the virtual facility itself, which may include one or more layers identifying elements such as humans, material handling equipment, robots, or items. Alternatively, or additionally, one or more such elements may be identified from the configuration information determined at 904, which may specify one or more dynamic elements to simulation. For instance, the simulation may model how a hypothetical new robot would interact with humans, robots, and/or items already present within the real facility 202 and represented within the virtual facility 216.

Updated state information for the one or more dynamic elements is predicted at 908. In some embodiments, the updated state information may include, for example, updated location information for the dynamic elements at a simulated successive point in time. For instance, the simulator may determine updated location information for the dynamic elements at a rate of once per millisecond, once per second, once per minute, or some other rate of time.

In some embodiments, the updated state information may be determined based on information represented within the virtual facility, as well as previous state information for the one or more dynamic elements. The previous state information may indicate, for instance, location information for a dynamic element over time. Such information may be stored within the virtual facility or may be retrieved from the data storage system 208. For example, the simulator may predict the location of a human or a robot at the next point in time based on the path traveled by the human or robot to reach their current location.

In some embodiments, updated state information for a robot may be determined based simulated output information, which is discussed in more detail with respect to the operation 912. According to various embodiments, ROS-bridging may allow the software component of a physical robot to experience the world model as the robot's reality. Accordingly, a robot operating system corresponding to a simulated robot may determine an action to perform in the environment as it normally would were it running on a robot physically present in the environment.

An updated state of the virtual facility is determined at 910. According to various embodiments, the updated state of the virtual facility may include the static elements of the virtual facility along with any changes brought about by the updated state information for the dynamic elements predicted at 908.

In some embodiments, updating the virtual facility may involve determining new configuration information for a simulated robot. For example, if the updated state information determined at 908 results in a simulated robot moving from one location to another, the location of the simulated robot and the simulated robot's simulated sensors may be updated. As another example, the virtual facility may include a physics model in which one or more movable objects or elements of the environment may be affected by the updated state information determined at 908.

Simulated output information is determined at 912 based on the updated state of the virtual facility. According to various embodiments, the nature of the simulated output information may depend in significant part on the configuration information determined at 904. For example, the simulated output information may include one or more analytics values such as a simulated value for item throughput, workflow execution time, or other such predetermined metrics.

In some embodiments, the simulated output information may include simulated sensor data for a simulated robot. The simulated sensor data may be determined by simulating visual data, depth sensor data, and/or other data for the types of sensors associated with the robot, from the positions at which those sensors are simulated. Such simulation may be performed by the 3D engine in which the virtual facility is generated. For example, the simulation may be similar to the generation of visual display information for a user playing a video game in a virtual 3D environment, from the perspective of the user's field of view.

In some embodiments, simulated sensor data may be provided to a robot simulation model. For example, the simulated sensor data may be provided via robot operating system (ROS) bridging, which may allow a ROS-based robot to experience the world model as the robot's reality. In this way, a robotics innovator may be able to drastically accelerate iterative development and/or deployment processes, since information such as sensor data, maps, and annotations may be made available instantly.

A determination is made at 914 as to whether to continue to simulate the virtual facility. According to various embodiments, the virtual facility may continue to be simulated until a triggering condition is met. The triggering condition may be the passage of a period of time, a particular state for one or more of the dynamic and/or static elements of the virtual facility, the performance of a designated action or workflow, or any other type of specifiable condition.

Upon determining to continue to simulate the virtual facility, updated state information for the one or more dynamic elements is determined at 908. Upon determining instead not to continue simulating the virtual facility, the simulation information is stored at 916. In some embodiments, the simulation information may be stored in the data storage system 208. The stored data may include any or all of the simulated output information determined at 912.

Figure 10:
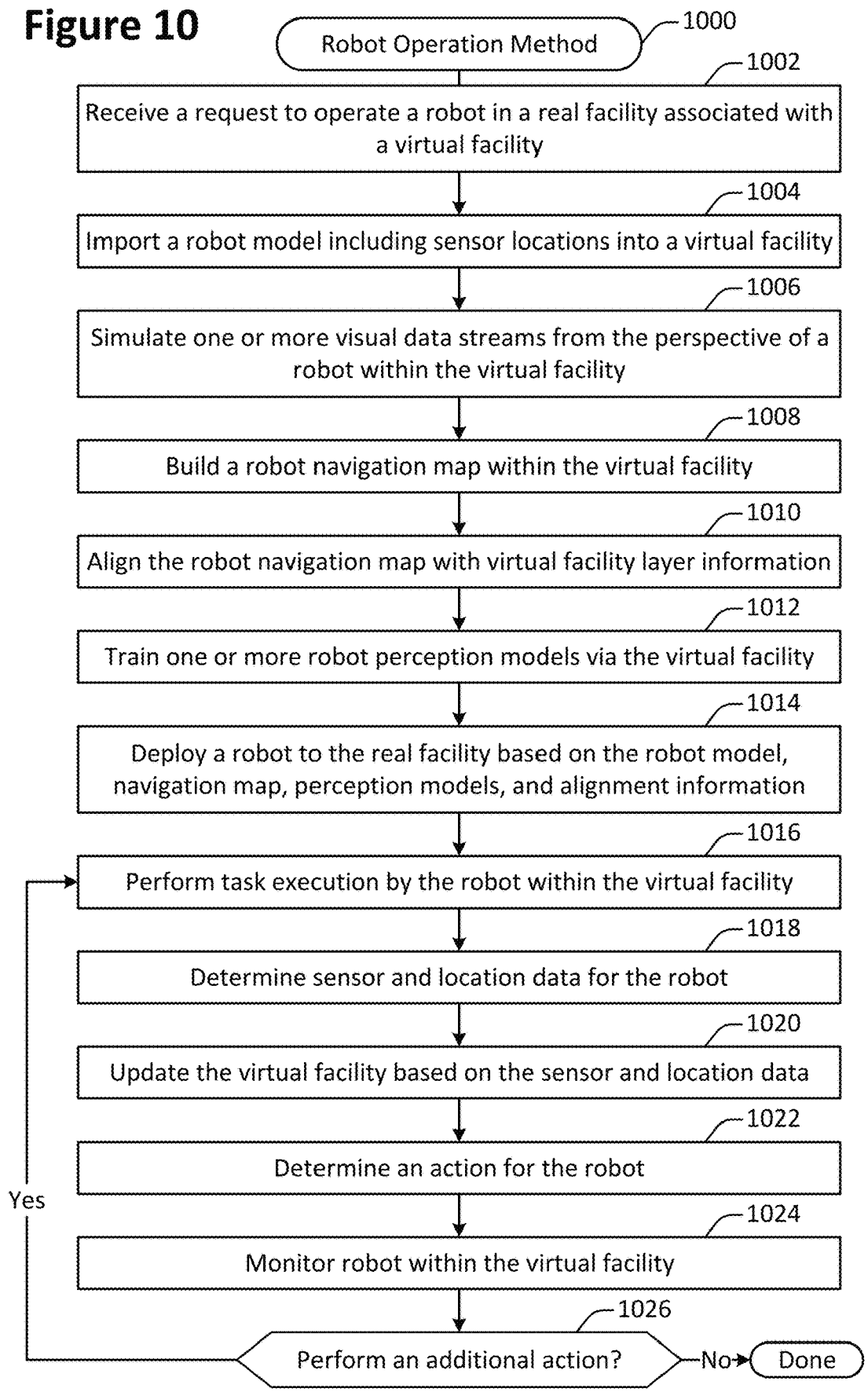
FIG. 10 illustrates a method for operating a robot in an environment associated with a virtual facility, performed in accordance with one or more embodiments.

FIG. 10 illustrates a method 1000 for operating a robot in an environment associated with a virtual facility, performed in accordance with one or more embodiments. The method 500 may be performed at any suitable computing system. For instance, the method 1000 may be performed at one or more components of the virtual facility system 300 shown in FIG. 3.

A request is received at 1002 to operate a robot in a real facility associated with a virtual facility. In some embodiments, the request may be received at the robot itself. Alternatively, the request may be received at a remote system configured to remotely control or instruct the robot. For instance, the request may be received at a fleet controller configured to control multiple robots.

A robot model including sensor locations is imported into a virtual facility at 1004. In some embodiments, the robot model may be provided by the robot manufacturer. The robot model may include information such as a physical configuration of the robot, the location of sensors on the robot, one or more capabilities of the robot, an operating system associated with the robot, and the like.

At 1006, one or more visual data streams are simulated from the perspective of the robot within the virtual facility. In some embodiments, the one or more visual data streams may be produced by the virtual facility simulator. As discussed herein, the virtual facility simulator may be used to determine simulated data from various perspectives. The sensor location information included in the robot model imported at 1004 may be used to simulate sensor data from the perspective of the robot. The particular characteristics of the sensor data (e.g., RGB color imagery, depth sensor data, etc.) may depend on the particular sensors available to the robot.

A robot navigation map within the virtual facility is built at 1008. In some embodiments, the robot navigation may include information used by the robot to navigate the facility. For instance, the robot navigation map may indicate corridors and regions on a 2D representation of the facility corresponding to locations where the robot is to navigate. The robot navigation map may be parameterized with a coordinate system that allows for the specification of navigation information, such as waypoints.

The robot navigation map is aligned with the virtual facility layer information at 1010. In some embodiments, aligning the robot navigation map with the virtual facility layer information may involve determining a correspondence between one or more coordinates associated with the virtual facility layers and one or more coordinates associated with the robot navigation map.

A robot is deployed to the real facility at 1014 based on the robot model, the navigation map, the one or more perception models, and the alignment information. According to various embodiments, such information may be used to update the robot itself, a fleet manager for the robot, the virtual facility, and/or other components of the virtual facility ecosystem to integrate the deployed robot.

Task execution by the robot within the virtual facility is performed at 1016. According to various embodiments, the particular task to be executed may depend on the configuration of the facility and the robot. For example, task execution may involve assigning the robot to a workflow to accomplish an objective.

Sensor and location data for the robot is determined at 1018. According to various embodiments, the sensor data and/or location data may include any data collected at the robot or concerning the robot. For example, the sensor data and/or location data may include visual data, depth sensor data, location coordinates, and/or other types of data. Depending on the configuration, such data may be collected at the robot itself and/or may be collected at different device, such as a fixed camera having the robot in view.

The virtual facility is updated at 1020 based on the sensor and location data. In some embodiments, the virtual facility may be updated based on sensor data. Updating the virtual facility may involve updating the location or configuration of objects within the environment or aspects of the environment itself. Alternatively, or additionally, the structure of the virtual facility itself may be updated, for instance by using generative AI to determine new model information based on sensor data received from the robot. Additional details for updating the virtual facility are discussed throughout the application, for instance with respect to the method 1600 shown in FIG. 16.

An action is determined for the robot at 1022. The action may be determined based on the sensor data, the location data, and the virtual facility. According to various embodiments, the action may be determined at the robot itself, at a fleet controller, at the robot in conjunction with the fleet controller, or at a different component.

According to various embodiments, the action may be any action capable of being taken by the robot. For example, the action may involve movement, operation of one or more manipulation devices at the robot, and/or communication. In some configurations, the action may be a workflow or an operation included in a workflow. Such actions may be determined by the robot itself, by a fleet controller, or by the robot working in concert with the fleet controller.

According to various embodiments, the action may be determined based at least in part on environment information may be determined from the virtual facility but which the robot may not necessarily be able to determine absent the virtual facility. For example, the virtual facility may be used to determine a path from the robot's location to a destination, particularly when that path involves navigating through regions not directly visible to the robot via the sensor data. As another example, the virtual facility may provide information about the location of dynamic elements in the physical environment, such as people, animals, machines, pallets, or other robots. The virtual facility may be used to store and update the location of such elements. As yet another example, the virtual facility may be used to coordinate information between the robot and an infrastructure layer such as a warehouse management system. For instance, the robot may be instructed to retrieve an item from within a warehouse. The logical location of the item may be determined by the warehouse management system, and that logical location may then be mapped to a spatial location in the virtual facility. The robot may then determine a path to the spatial location via mapping information determined based on the virtual facility.

In some embodiments, the environment information may be determined based on one or more queries sent to the virtual facility. The execution of such queries may involve operations such as identifying information stored in the virtual facility, resolving potentially conflicting information, and providing a response. Such queries may be sent by any computing device associated with control of the robot. Additional details regarding the execution of such queries are discussed with respect to the method 1100 shown in FIG. 11.

The robot is monitored within the virtual facility at 1024. According to various embodiments, monitoring the robot may involve performing operations such as ensuring compliance with one or more rules, tracking the robot's performance, and/or sending one or more alert messages.

A determination is made at 1026 as to whether to perform an additional action. In some embodiments, additional actions may continue to be performed until a triggering condition is met. For example, the performance of additional actions may be terminated based on user input, the passage of a designated period of time, the performance of a designated course of action, and/or the occurrence of some other type of event.

Figure 11:
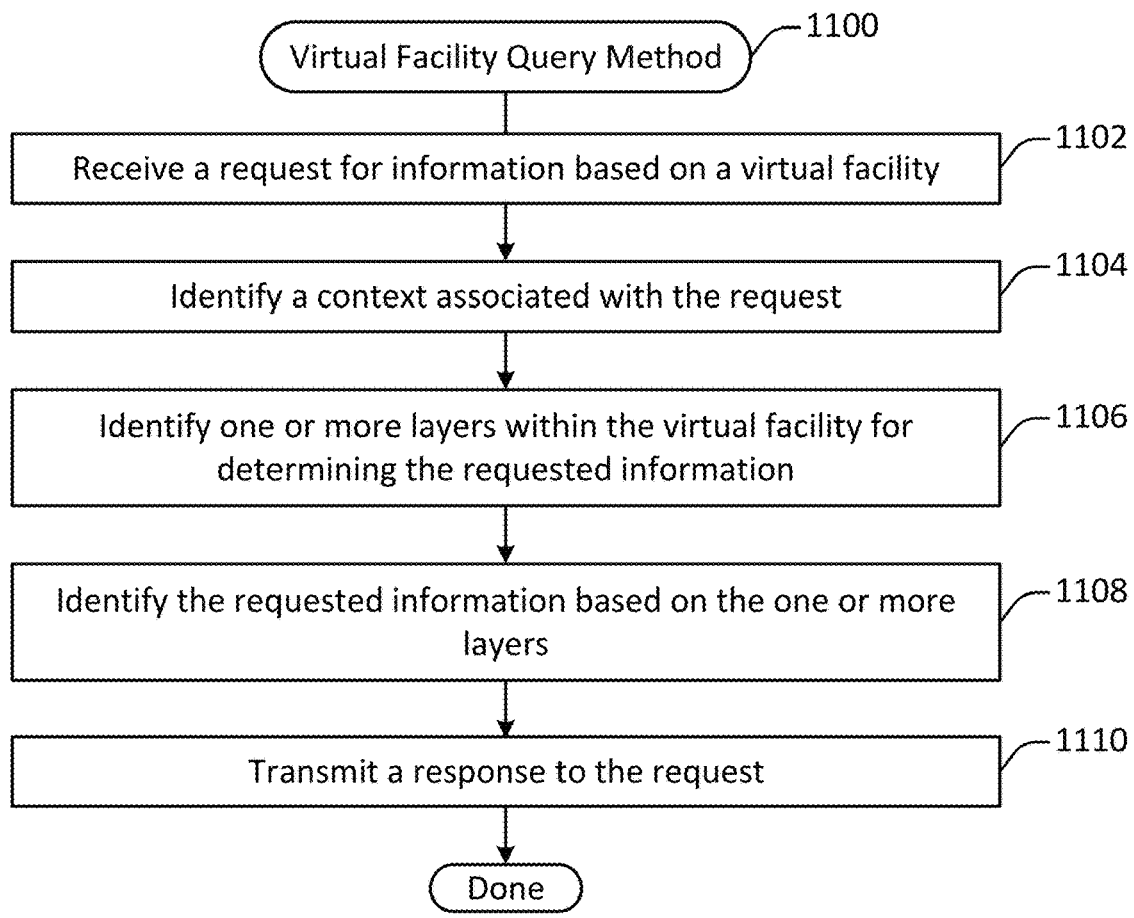
FIG. 11 illustrates a method for handling a query at a virtual facility, performed in accordance with one or more embodiments.

FIG. 11 illustrates a method 1100 for handling a query at a virtual facility, performed in accordance with one or more embodiments. The method 1100 may be performed in any suitable computing device, such as cloud computing system or a local computing system. For instance, the method 800 may be performed at the virtual facility system 300 shown in FIG. 3.

A request for information based on a virtual facility is received at 1102. A context associated with the request is identified at 1104. According to various embodiments, the request may be received in any of a variety of contexts. For example, a request for information may be received from a fleet manager interface 342 based on a query from a fleet management system, for instance in the course of determining instructions to provide to a robot. As another example, a request for information may be received from the analytics system 214 in the course of determining analytics information. As yet another example, a request for information may be received from the facility management system interface 340 in the course of responding to a request from a facility management system.

One or more layers within the virtual facility are identified at 1106 for determining the information. According to various embodiments, different layers within the virtual facility may provide various types of information.

The requested information identified at 1108 based on the one or more layers. According to various embodiments, the identification of the information may depend on the type of information being requested. For example, photorealistic sensor data may be determined from a photorealistic 3D model layer, whereas robot locations may be determined from a robot telemetry data layer. Depending on the context, various types of data may be generated.

In some embodiments, the data may include novel visual data. Building the three-dimensional model may involve employing a novel rendering model based on spatial generative AI. The resulting model can perform neural inpainting to fill in or edit visual information by extrapolating data using context and past observations. Novel views can be synthesized. That is, new camera views that were not present in the captured data can be generated for purposes such as robot sensor simulation for sensors in different positions than the capturing camera. Moreover, previous version of the virtual facility may be maintained and used to enrich the creation of new version of the virtual facility, new scenarios, and newly requested data.

In some embodiments, the data may include visualization of rich visual semantics such as agents (people forklifts, pallet jacks, dollies, etc.), objects (e.g., boxes, pallets, fire hydrants), and/or place information (barcodes, racking, doors, floors). Through the generation of such photorealistic visualization data, the virtual facility can provide for the creation of semantically annotated, realistic, dynamic scenarios based on context and past observation. The visual data that may be generated may include RGB data, depth data, 2D data (e.g., maps), 3D LiDAR data, or other types of data.

According to various embodiments, identifying the requested information may involve resolving an inconsistency between different layers. Such resolution may depend on the type of information and the context for which it is applied. For example, a robot telemetry layer may provide the most reliable real-time data for robot location, whereas an item location layer may provide the most reliable real-time data for inventory location.

A response to the request is transmitted at 1110. The response may include the information identified at 1108.

Facility Monitoring

Figure 12:
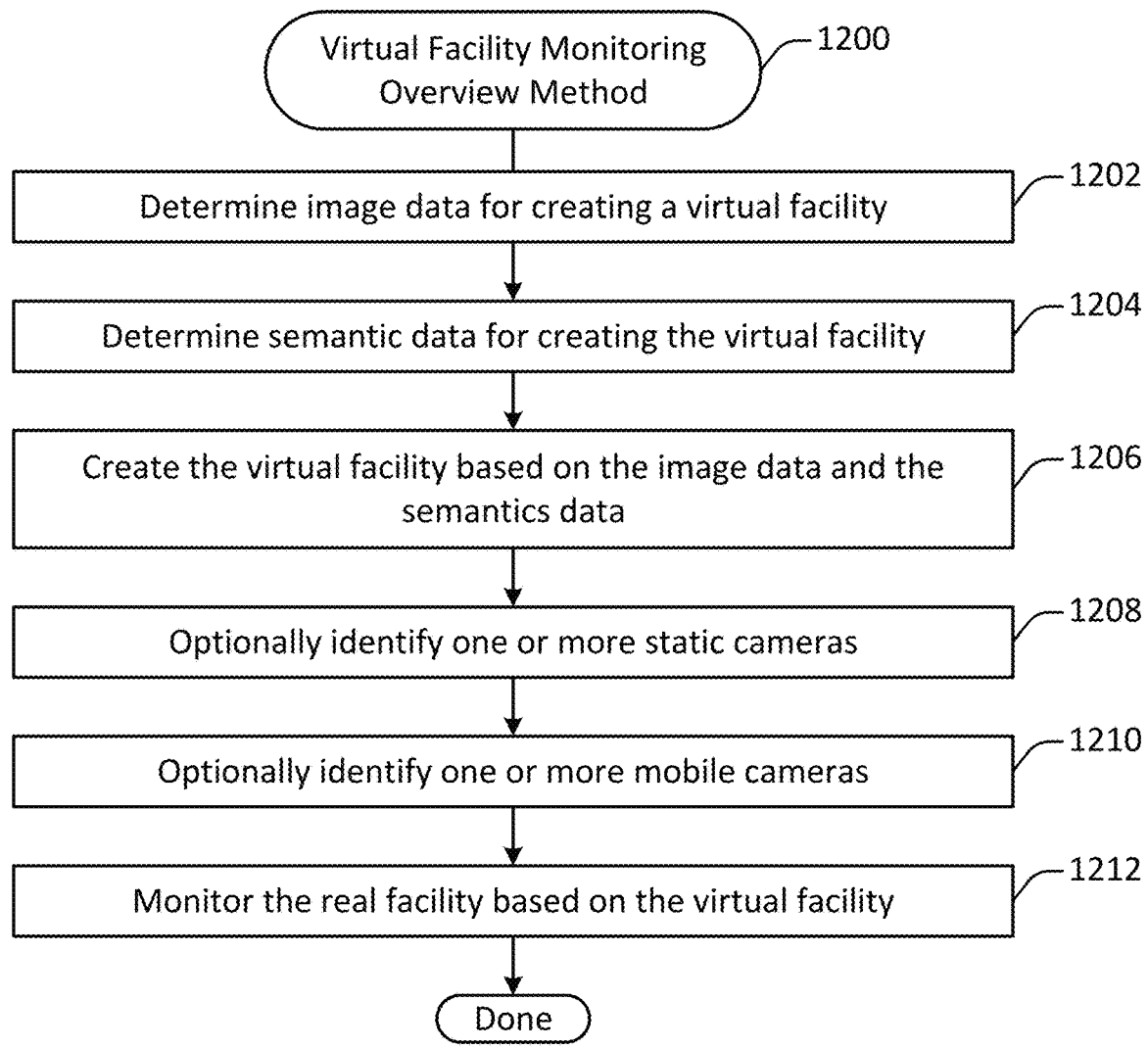
FIG. 12 illustrates a facility monitoring overview method, performed in accordance with one or more embodiments.

FIG. 12 illustrates a facility monitoring overview method 1200, performed in accordance with one or more embodiments. The method 1200 may be used to create a virtual facility and employ it for the purpose of monitoring a real facility. The method 1200 may be performed at one or more components of a virtual facility ecosystem, such as for example at the data engine 206 and/or the simulator engine 220.

Image data for generating the virtual facility is determined at 1202. According to various embodiments, as discussed herein, the image data may be generated by one or more mobile cameras traversing the real facility 202 and providing the associated data for virtual facility generation. A mobile camera may be located on a dedicated capture device, a forklift or other human assistive device, on a body camera, on an autonomous mobile robot, or on any other type of device.

Semantic data for generating the virtual facility is determined at 1204. According to various embodiments, as discussed herein, the semantic data may include one or more of various types of information, which may be received from the integration and configuration system 204 or provided in some other way. For example, the semantic data may include information about inventory characteristics such as inventory item type, quantity, and location within the real facility 202.

The virtual facility is created at 1206. Creating the virtual facility may involve determining one or more layers that collectively provide a representation of the real facility 202. The virtual facility may be created based on the image data determined at 1202 and the semantic data determined at 1204. Additional details regarding the creation of the virtual facility are discussed throughout the application, for instance with respect to the method 600 shown in FIG. 6.

One or more static cameras are optionally identified at 1208. In some embodiments, one or more static cameras may be located at fixed points within the real facility 202. As discussed with respect to FIG. 2, a static camera may be communicably coupled with the data engine 206 so that the data engine can receive image data from the static camera. Identifying a static camera may involve performing one or more calibration operations. Additional details regarding the types of operations that may be performed when identifying one or more static cameras are discussed with respect to the method 1300 shown in FIG. 13.

One or more mobile cameras are optionally identified at 1210. In some embodiments, one or more mobile cameras may be located on mobile devices operating within the real facility 202. For example, a mobile camera may be located on a dedicated capture device, a forklift or other human assistive device, on a body camera, on an autonomous mobile robot, or on any other type of device. As discussed with respect to FIG. 2, a mobile camera may be communicably coupled with the data engine 206 so that the data engine can receive image data from the mobile camera.

Figure 14:
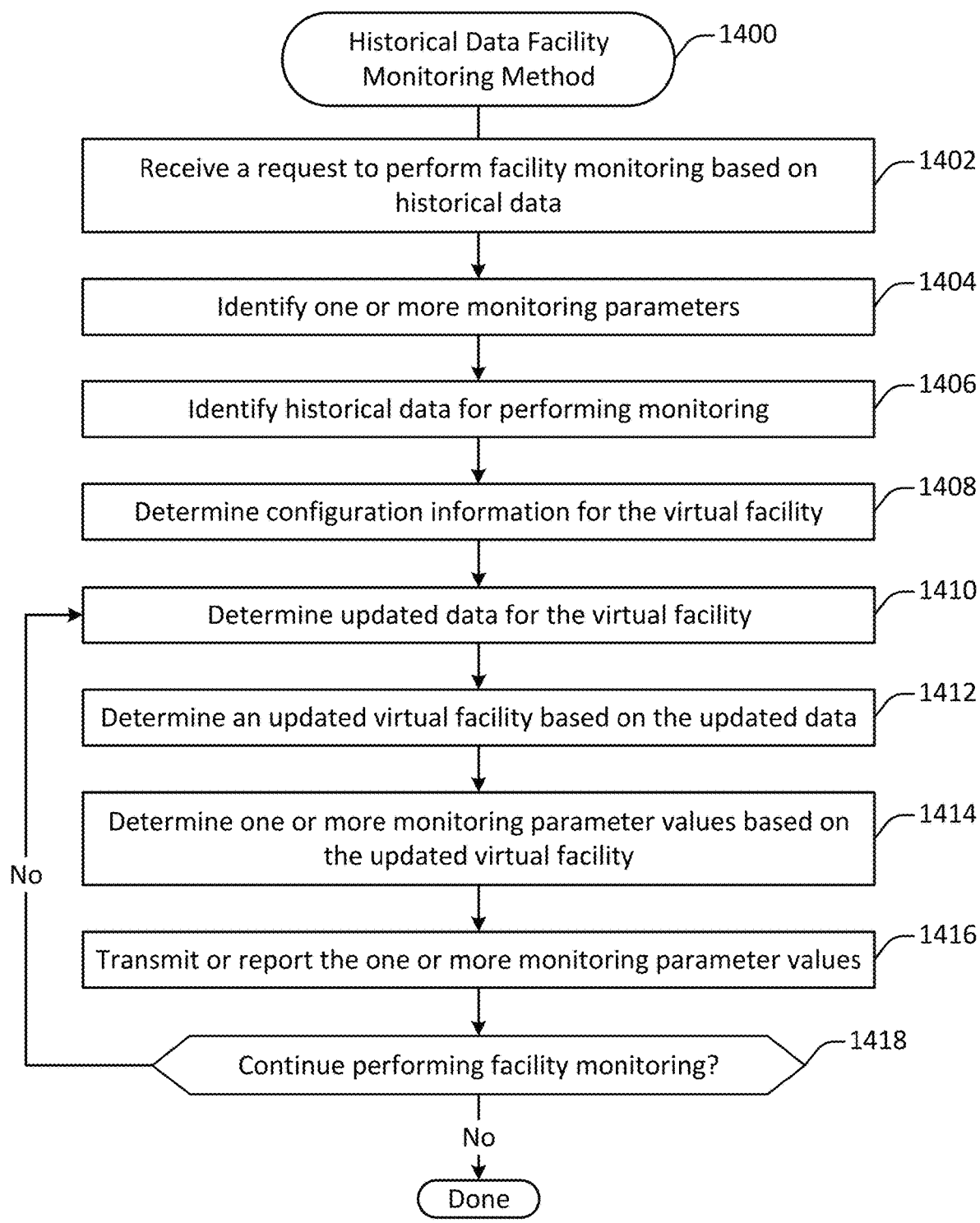
FIG. 14 illustrates a historical data monitoring method, performed in accordance with one or more embodiments.
Figure 15:
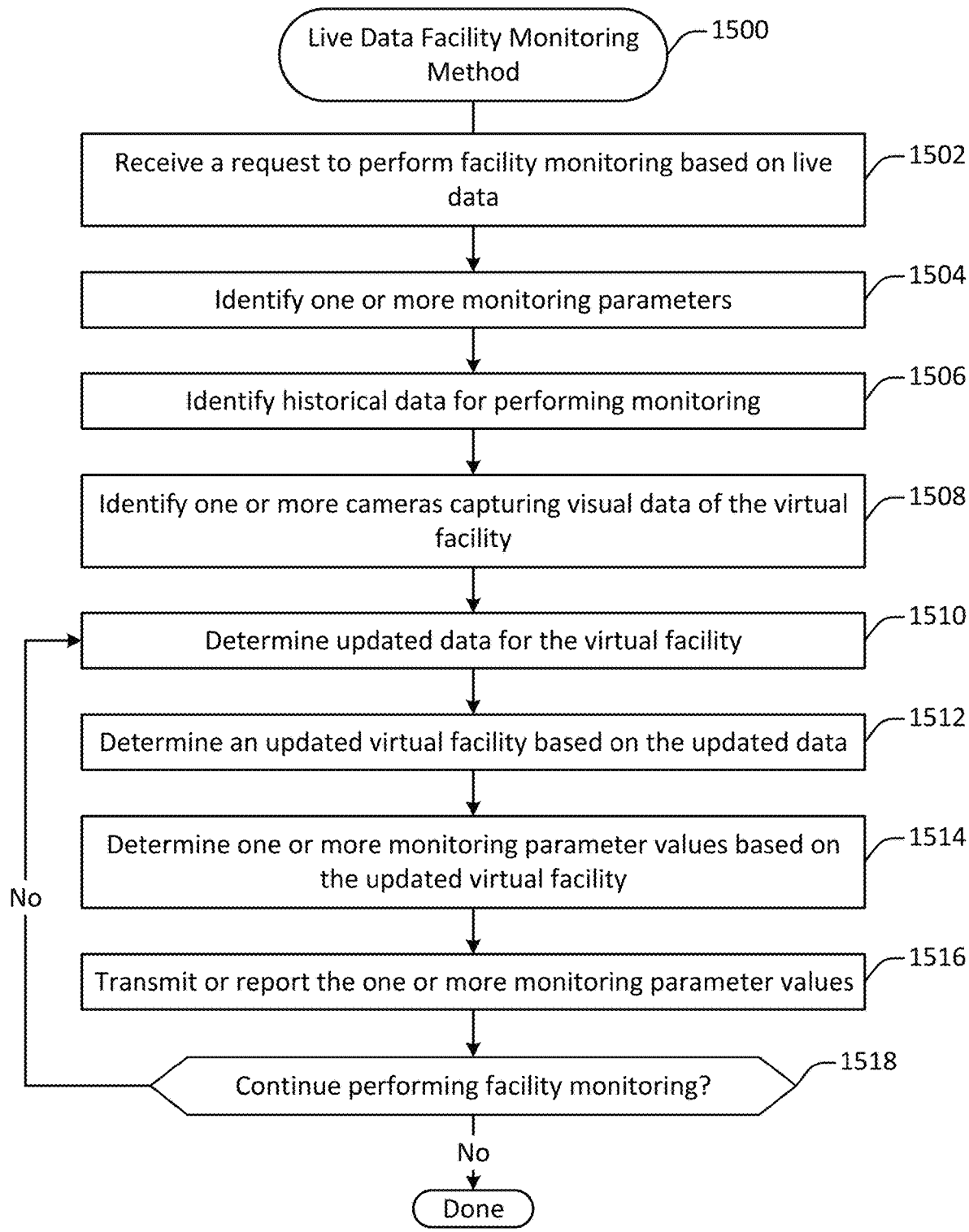
FIG. 15 illustrates a live data monitoring method, performed in accordance with one or more embodiments.

Monitoring of the real facility based on the virtual facility is performed at 1212. According to various embodiments, monitoring the virtual facility may involve operations such as performing one or more simulations, reconciling inconsistent information, generating one or more alerts, determining one or more metrics, and/or other such tasks. The specific operations performed in the course of virtual facility monitoring may depend in significant part on the type of monitoring configured by an operator as well as the information available within the virtual facility. However, FIG. 14 and FIG. 15 provide examples of methods that may be performed in the course of monitoring the virtual facility.

Figure 13:
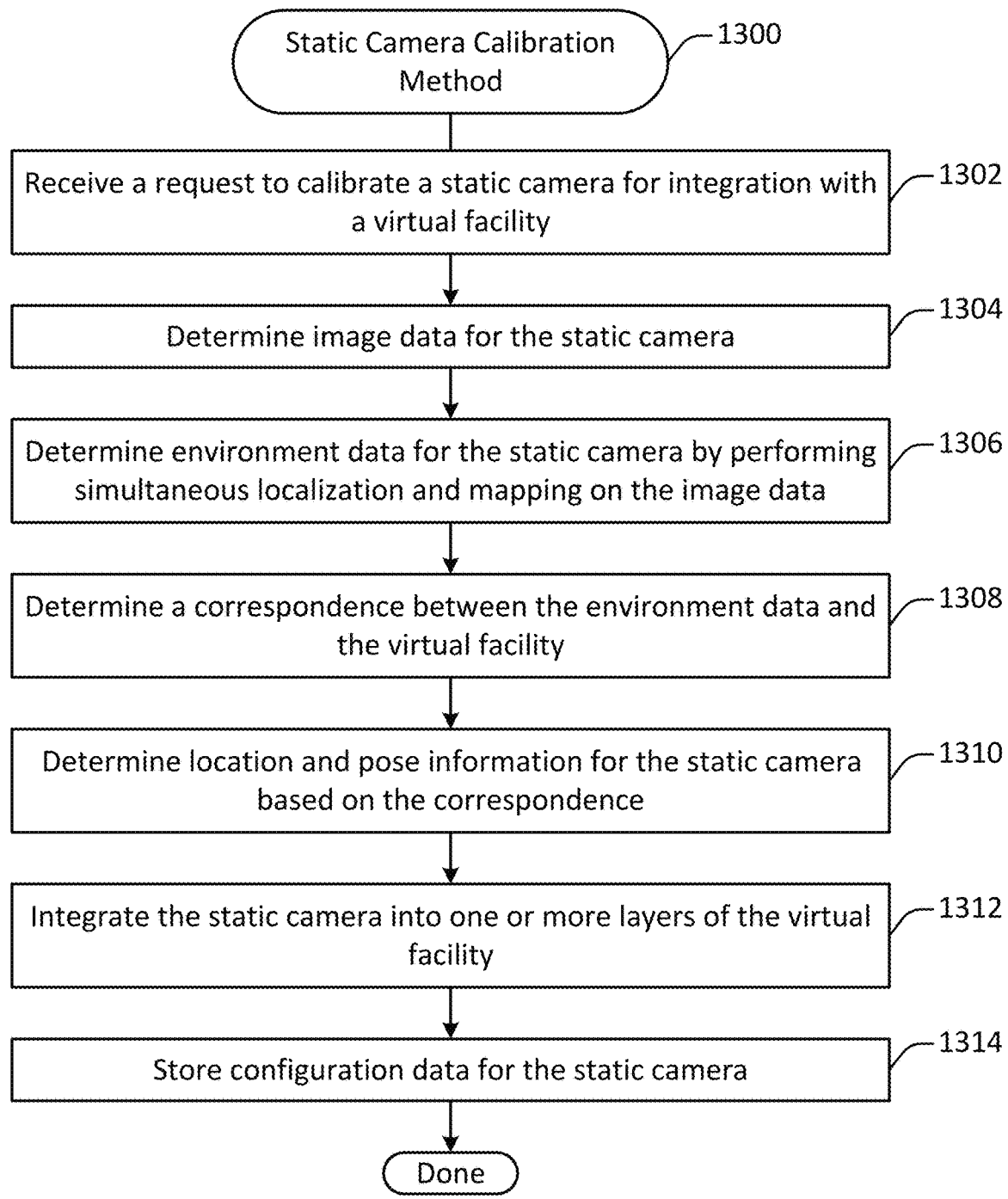
FIG. 13 illustrates a method for estimating the pose of a camera, performed in accordance with one or more embodiments.

FIG. 13 illustrates a method 1300 of estimating the pose of a camera, performed in accordance with one or more embodiments. The method 1300 may be performed at one or more components of a virtual facility ecosystem, such as for example at the data engine 206 and/or the simulator engine 220. The method 1300 may be performed to calibrate a camera identified as discussed with respect to the operation 1208 shown in FIG. 12.

A request to calibrate a static camera for integration with a virtual facility is received at 1202. According to various embodiments, a static camera may be calibrated when it is initially added to the virtual facility ecosystem 200. Alternatively, the static camera may be calibrated periodically. As yet another possibility, the static camera may be calibrated when a determination is made that the camera has been repositioned.

Image data for the static camera is determined at 1304. In some embodiments, the image data may be stored in the data storage system 208 and retrieved upon request. For example, the image data may be captured continuously and streamed. As another example, the image data may be batched for transmission to the data storage system 208.

In some embodiments, a static camera may be configured in a warehouse environment. For instance, different static cameras may be configured to capture different regions of a warehouse. The static cameras may be configured to capture images of people, robots, forklifts, and other dynamic elements of the real facility 202 in the course of normal operations.

Environment data for the static camera is determined at 1306 by performing simultaneous localization and mapping on the image data. According to various embodiments, the nature of the simultaneous localization and mapping may depend on the nature of the image data. For example, in the case of visual data, a visual simultaneous localization and mapping process may be performed. As another example, the in the case of LiDAR data, a lidar simultaneous localization and mapping process may be performed.

In some embodiments, environment data for the static camera may be determined in concert with environment data for other static cameras. For example, different static cameras may have overlapping fields of view. These overlapping fields of view may provide for common features shared between the image data of the different cameras, which may facilitate more accurate and coordinated localization of the cameras.

In some embodiments, the environment data for the static camera may include a local three-dimensional representation of the environment captured by the static camera. The environment data may also include a pose of the static camera relative to the three-dimensional representation.

A correspondence between the environment data and the virtual facility is determined at 1308. In some embodiments, the correspondence may be determined by mapping points in the environment data to points represented within the virtual facility.

Location and pose information for the static camera is determined at 1310 based on the correspondence. In some embodiments, the location and pose information may be determined by mapping the location and pose of the camera relative to the representation of the environment data determined at 1306 to a location and pose determined based on the correspondence between the environment data and the virtual facility. The location and pose information may identify a location of the static camera within the virtual facility as well as a pose of the static camera at that location. The pose may identify the direction in which the camera is pointing, for instance in terms of roll, yaw, and pitch.

The static camera is integrated into one or more layers of the virtual facility at 1312. In some embodiments, integrating the camera into the virtual facility may involve, for instance, updating a layer to reflect the location and/or pose information. For example, a two-dimensional map of the virtual facility may be updated to indicate the camera's location. As another example, a three-dimensional representation of the virtual facility may be updated to indicate the camera's location and pose.

Configuration data for the static camera is stored at 1314. In some embodiments, the configuration data may be stored in the data storage system 208. The configuration data may support analyzing image data received from the static camera by positioning the image data relative to other elements of the virtual facility.

FIG. 14 illustrates a historical data monitoring method 1400, performed in accordance with one or more embodiments. The method 1400 may be performed at one or more components of a virtual facility ecosystem, such as for example at the data engine 206 and/or the simulator engine 220.

A request to perform facility monitoring based on historical data is received at 1402. In some embodiments, the request may be generated by a client machine and may be received at one or more elements of the virtual facility system 300. The request may be received in the context of a virtual facility created as discussed with respect to the operation 1206 shown in FIG. 12.

One or more monitoring parameters are identified at 1404. In some embodiments, the one or more monitoring parameters may include one or more metrics or parameter values associated with the execution of a task or workflow. For example, such metrics or parameter values may include characteristics such as elapsed time or distance traveled during the execution of a task or workflow. As another example, metrics or parameter values may include statistical information such as mean, median, standard deviation, or other statistics associated with time or distance during the performance of a task or workflow.

According to various embodiments, the one or more monitoring parameters may include an indication of data to simulate. For example, in the warehouse context, historical data characterizing the real-time location of items may be used to simulate a visual representation of the warehouse over time as the items are moved through the warehouse.

According to various embodiments, the one or more monitoring parameters may include an indication of the objective associated with the monitoring request. For example, monitoring may be used to identify the time needed to perform a workflow or other operation. As another example, monitoring may be used to identify one or more inefficiencies associated with a workflow or other operation. As yet another example, monitoring may be used to track the movement of an item through the real facility 202, for instance as an inventory item is moved from a warehouse shelf through a workflow process in which the inventory item is packaged and sent for transport.

In some embodiments, one or more monitoring parameters may be included in the request received at operation 1402. Alternatively, or additionally, one or more monitoring parameters may be retrieved from a storage location. For example, one or more default monitoring parameters may be retrieved to supplement information included in the request.

Historical data for performing monitoring is identified at 1406. In some embodiments, the historical data may already be included in the virtual facility determined at 1206. Alternatively, or additionally, additional historical data may be identified specifically for performing the monitoring operation. For example, hypothetical historical data may be used to facilitate a hypothetical monitoring task. As another example, historical data with additional granularity may be identified to support a specific monitoring task. As another example, updated historical data may be identified to update the virtual facility based on recently determined information. The historical data may be received from the integration and configuration system 204, may be retrieved from the data storage system 208, or may be provided in some other way, such as via upload or user input.

Configuration information for the virtual facility is determined at 1410. In some embodiments, the configuration information may include an initial state for performing analytics or monitoring. For example, the configuration information may specify a point in time associated with the historical data, an area of the virtual facility to monitor, and/or other initialization information.

Updated data for the virtual facility is determined at 1410. In some embodiments, the updated data may include information included in the historical data identified at 1406 and/or information determined based on simulation.

An updated virtual facility is determined at 1412 based on the updated data. In some embodiments, the updated virtual facility may include updated semantic data. For instance, one or more layers that indicate locations and counts of items may be updated. Alternatively, or additionally, the updated virtual facility may include updated visual data determined based on the image data received from the static or dynamic cameras.

One or more monitoring parameter values are determined at 1414. In some embodiments, the monitoring parameter values may be determined by accessing the virtual facility, for instance via the analytics system 214. That is, the data engine 206 in communication with the virtual facility may determine suitable answers to the questions posed by the one or more monitoring parameters identified at 1404.

According to various embodiments, the particular operations performed to determine the one or more monitoring values may depend in significant part on the type of monitoring. For instance, the virtual facility may be used to report inventory levels, determine the average time involved in assembling and delivering a pallet, counting the number of pallets moved per day, or determining other such values. Such information may be extracted from the virtual facility.

At 1416, one or more monitoring parameter values are transmitted. In some embodiments, one or more monitoring parameter values may be stored to the storage system. Alternatively, or additionally, one or more monitoring parameter values may be sent to a client machine.

In some embodiments, an alert message may be sent instead of, or in addition to, the one or more monitoring parameter values. For example, the one or more monitoring parameters may include a request to identify if and when a designated condition occurs in the facility. For instance, an alert may be generated if a determination is made that a fire door is obstructed since such an obstruction may constitute a violation of regulations or policies. When such a situation is detected, an alert message may be transmitted to a suitable recipient.

A determination is made at 1418 as to whether to continue to perform facility monitoring. In some embodiments, facility monitoring may continue until a terminating condition is met. Such a terminating condition may be specified in the one or more monitoring parameters identified at 1404. Various types of terminating conditions are possible. For example, monitoring may continue until manually halted, until a designated condition or state is reached, or until a designated period of time has passed. Upon determining to continue to perform facility monitoring, updated data for the virtual facility is determined at 1410.

FIG. 15 illustrates a live data monitoring method 1500, performed in accordance with one or more embodiments.

The method 1500 may be performed at one or more components of a virtual facility ecosystem, such as for example at the data engine 206 and/or the simulator engine 220.

A request to perform facility monitoring based on live data is received at 1502. In some embodiments, the request may be generated by a client machine and may be received at one or more elements of the virtual facility system 300. The request may be received in the context of a virtual facility created as discussed with respect to the operation 1206 shown in FIG. 12.

One or more monitoring parameters are identified at 1504. In some embodiments, the monitoring parameters may include any or all of the parameters discussed with respect to the operation 1404 shown in FIG. 14. Alternatively, or additionally, other monitoring parameters may be supported based on the availability of live monitoring data.

In some embodiments, static cameras may capture key regions of the real facility 202. For instance, in a warehouse environment, one or more static cameras may capture image data of a loading dock, staging area, pick wall, put wall, or other such zone. Accordingly, data captured from static cameras may be used to determine parameter values for parameters such as time to assemble a pallet, time to deliver a pallet, time to disassemble a pallet, time to pick and pack an inventory item, a number of pallets produced per day, a number of boxes moved from storage per day, and/or any other information of interest.

In some embodiments, dynamic cameras may capture data from potentially every area of a real facility 202. For instance, forklift cameras or body cameras may capture image data from the perspective of people as they navigate the warehouse, while robot-mounted cameras may capture image data from the perspective of robots. Such data may be used to perform operations such as inventory checking in which the amount and location of inventory items is identified and validated against historical data indicating ostensible amounts and locations of inventory items.

Historical data for performing monitoring is identified at 1506. According to various embodiments, the historical data may be determined substantially as discussed with respect to the operation 1406 shown in FIG. 14.

3One or more cameras capturing visual data of the virtual facility are identified at 1508. According to various embodiments, the cameras may be identified as discussed with respect to the operations 1208 and 1210 shown in FIG. 12. In the case of a static camera, the camera's location and pose may optionally be retrieved and/or determined as discussed with respect to the calibration method 1300 shown in FIG. 13.

Updated data for the virtual facility is determined at 1510. In some embodiments, the updated data may include image data received from the one or more cameras identified at operation 1508. Alternatively, or additionally, the updated data may include information received from the integration and configuration system 204. For instance, the updated data may include updated inventory item number and location data.

An updated virtual facility is determined at 1512 based on the updated data. In some embodiments, the updated virtual facility may include updated semantic data. For instance, one or more layers that indicate locations and counts of items may be updated. Alternatively, or additionally, the updated virtual facility may include updated visual data determined based on the image data received from the static or dynamic cameras.

One or more monitoring parameter values are determined at 1514. In some embodiments, the monitoring parameter values may be determined by accessing the virtual facility, for instance via the analytics system 214. That is, the data engine 206 in communication with the virtual facility may determine suitable answers to the questions posed by the one or more monitoring parameters identified at 1504.

According to various embodiments, the particular operations performed to determine the one or more monitoring values may depend in significant part on the type of monitoring. For instance, the virtual facility may be used to report inventory levels, determine the average time involved in assembling and delivering a pallet, counting the number of pallets moved per day, or determining other such values. Such information may be extracted from the virtual facility.

At 1516, one or more monitoring parameter values are transmitted. In some embodiments, one or more monitoring parameter values may be stored to the storage system. Alternatively, or additionally, one or more monitoring parameter values may be sent to a client machine.

In some embodiments, an alert message may be sent instead of, or in addition to, the one or more monitoring parameter values. For example, the one or more monitoring parameters may include a request to identify if and when a designated condition occurs in the facility. For instance, an alert may be generated if a determination is made that a fire door is obstructed since such an obstruction may constitute a violation of regulations or policies. When such a situation is detected, an alert message may be transmitted to a suitable recipient.

A determination is made at 1518 as to whether to continue to perform facility monitoring. In some embodiments, facility monitoring may continue until a terminating condition is met. Such a terminating condition may be specified in the one or more monitoring parameters identified at 1504. Various types of terminating conditions are possible. For example, monitoring may continue until manually halted, until a designated condition or state is reached, or until a designated period of time has passed. Upon determining to continue to perform facility monitoring, updated data for the virtual facility is determined at 1510.

Figure 16:
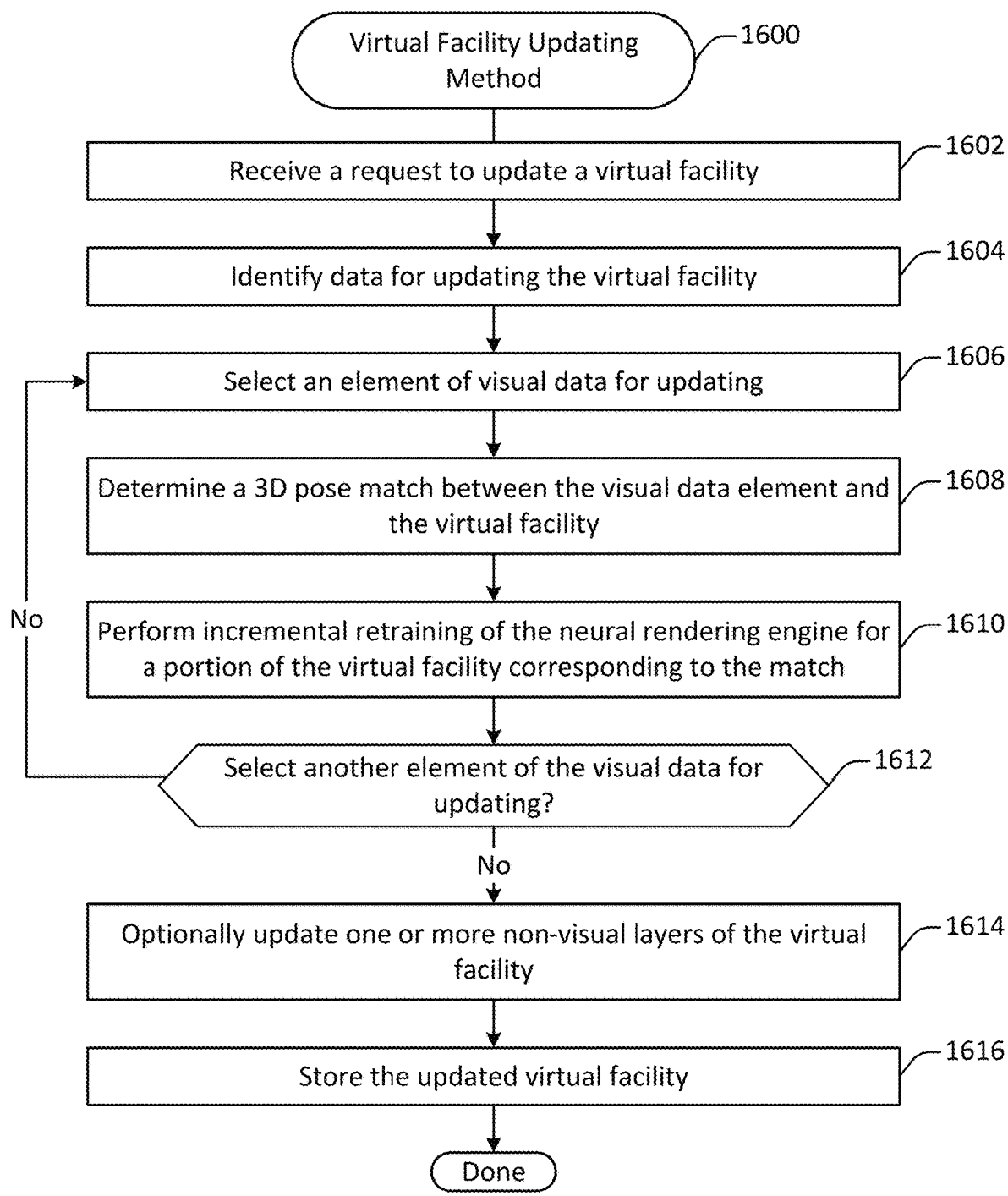
FIG. 16 illustrates a method for updating the virtual facility, performed in accordance with one or more embodiments.

FIG. 16 illustrates a method 1600 for updating the virtual facility, performed in accordance with one or more embodiments. According to various embodiments, the method 1600 may be performed at one or more components of the virtual facility ecosystem, such as the data engine 206.

A request to update a virtual facility is received at 1602. In some embodiments, the request may be generated periodically or upon the detection of a triggering condition. For example, the request may be generated when requested by a systems administrator or when new data is received.

Data for updating the virtual facility is identified at 1604. In some embodiments, the data may include new image data captured within the real facility. Alternatively, or additionally, the data may include data received from the integration and configuration system 204.

An element of visual data for update is selected at 1606. In some embodiments, the data for updating the virtual facility identified at 1604 may include one or more images and/or video segments. Such data may be analyzed in sequence or in parallel.

At 1608, a 3D pose match between the visual data element and the virtual facility is determined. In some embodiments, the 3D pose match may be determined based on camera pose estimation and/or vSLAM performed on the image data. The 3D pose match may be performed in a manner substantially similar to the processing of image data when the virtual facility is initially constructed.

At 1610, once a match is determined with high confidence, the neural rendering engine is incrementally retrained. In some embodiments, the portion of the neural rendering model may correspond to a region in which the 3D pose match is determined at 1608. In this way, the existing neural rendering model may be updated without needing to entirely retrain the neural rendering model. Furthermore, preexisting data may be used as a baseline and then updated using the new data, providing for the development of a richer model over time.

A determination is made at 1612 as to whether to select another element of the visual data for updating. Additional elements of visual data may continue to be selected until all visual data has been processed.

At 1614, one or more non-visual layers of the virtual facility may be updated. Such layers may include, for instance, one or more rules, location information for items or materials stored or processed within the real facility, place and/or location semantics, locations of people, robots, or other dynamic elements of the virtual facility, and/or any other information included in the virtual facility. Such information may be updated based on data received from the integration and configuration system 204.

Upon determining the updated virtual facility, it is stored at 1616. For instance, information for providing the virtual facility may be stored in the virtual facility system at 216 and/or in the data storage system 208.

User Interface Views

FIGS. 17-30 illustrate user interface views, generated in accordance with one or more embodiments. Such user interface views may be generated in a cloud-hosted computing system and provided via a browser. Alternatively, one or more user interface views may be generated in a locally-hosted computing system and/or accessed in some other way, for instance via a dedicated app.

FIG. 17 illustrates a user interface 1700 supporting dataset management. In FIG. 17, data sets may be uploaded at 1702. According to various embodiments, various types of data sets may be uploaded. For example, datasets may provide sensor data of a physical environment, data concerning robots for deployment in the physical environment, data about objects in the environment, data about elements in the environment, and the like. As another example, data sets may correspond to image data of a real facility, annotation data for objects potentially present in the real facility, semantic data, and/or other types of information.

At 1704, a machine learning model may be trained or evaluated. According to various embodiments, a machine learning model may be trained to recognize objects, generated novel views based on the virtual facility, predict an outcome, or perform other such tasks. Such models may be trained on a wide range of training data, since training data may be generated directly from the virtual facility. For example, a machine learning model associated with robot perception for a real or hypothetical robot may be trained using simulated sensor data determined from the virtual facility.

At 1706, one or more deployments may be managed. For example, fleets of real and/or virtual robots may be deployed to operate in the real or virtual facility. As another example, individual devices may be deployed to a facility. As yet another example, deployments may be used to manage different virtual facilities associated with the same organization, for instance associated with different real facilities at different geographic locations.

Figure 18:
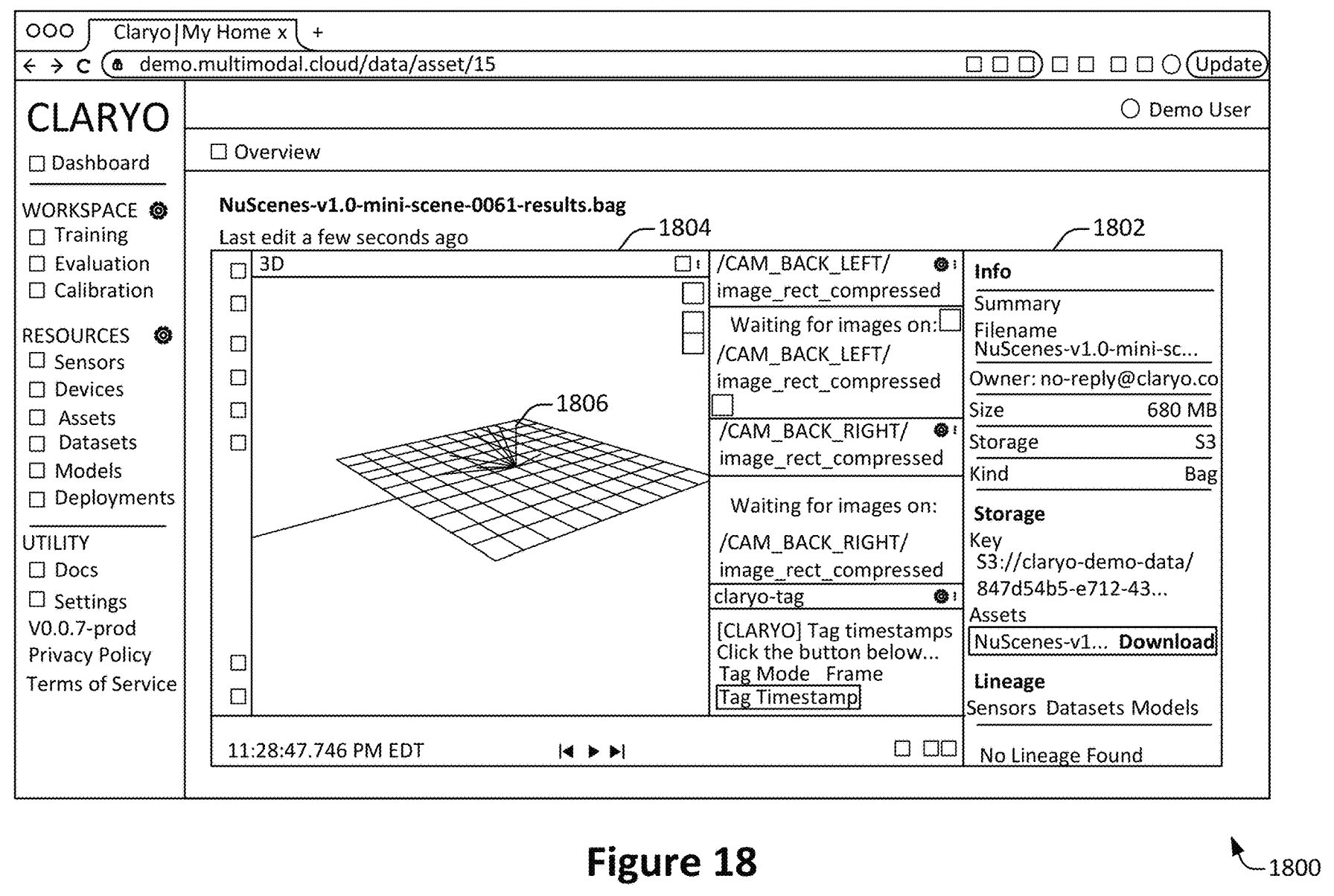

FIG. 18 illustrates a user interface 1800 for training and representing a machine learning model. Information about the model is shown at 1802. A three-dimensional representation of the machine learning model is shown at 1804, with the vectors 1806 representing sensor data received by a hypothetical robot.

FIG. 19 illustrates a user interface 1900 for interacting with a data set that includes image data generated by a camera. As shown at 1904, such data may be used to calibrate a camera. Collected information may include camera data, including different camera views, as well as contact points by RADAR and LiDAR sensors. Additional information may be determined as well, such as compressed images, annotations determined by object recognition, and point clouds.

Figure 20:
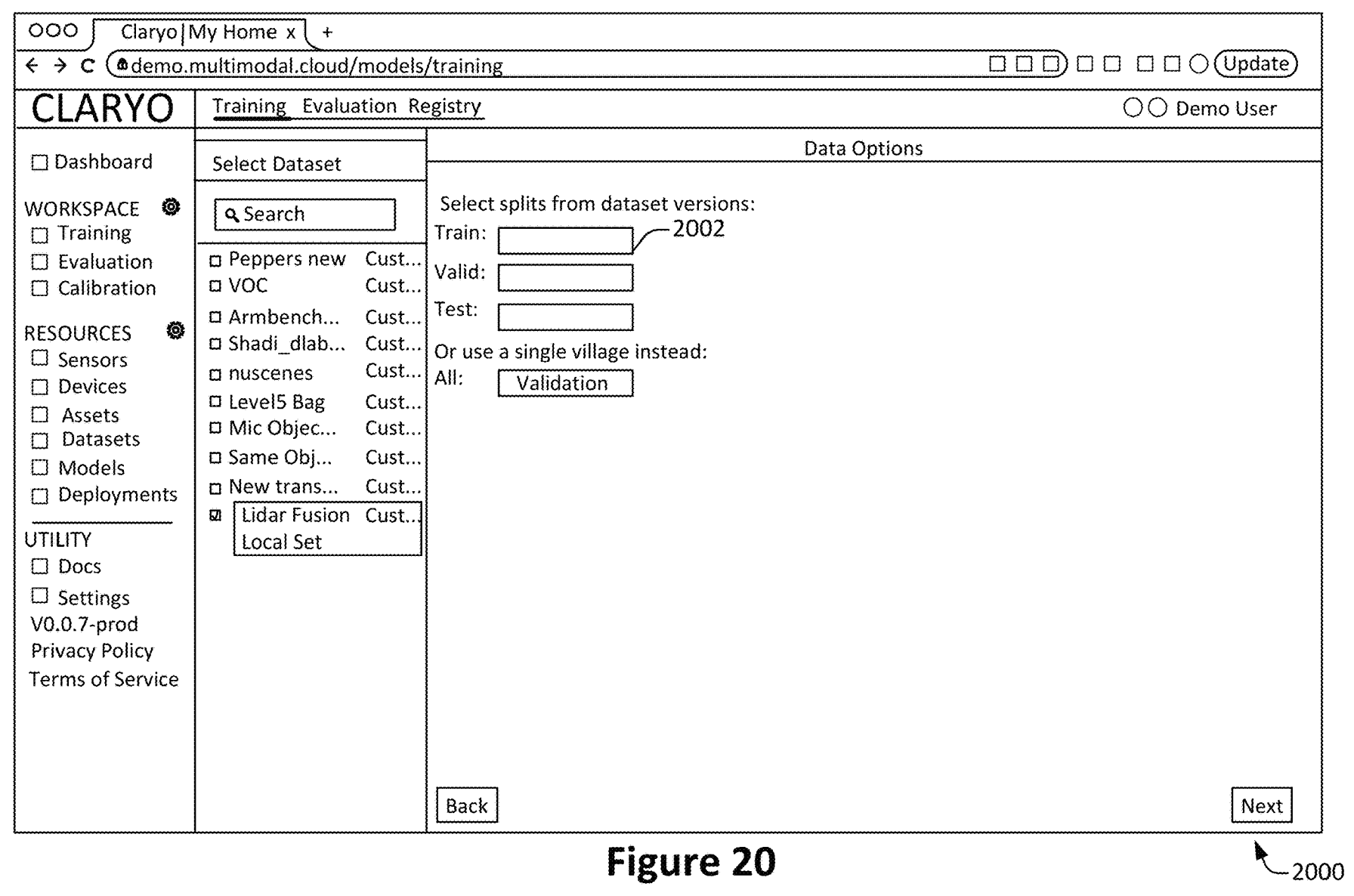

As shown in the user interface 2000 in FIG. 20, data may be used for training at 2002. For example, training may be applied to robots, object recognition computer vision machine learning models used across robots, and/or other types of machine learning models.

Output of the training process is shown in the user interface 2100 shown in FIG. 21. For example, output information for various trials in a training process may be accessed at 2102. According to various embodiments, techniques and mechanisms described herein may be used to provide a no-code or low-code interface with cloud hosting of machine learning infrastructure training that makes it easy to train and test complex models with minimal experience.

Figure 22:
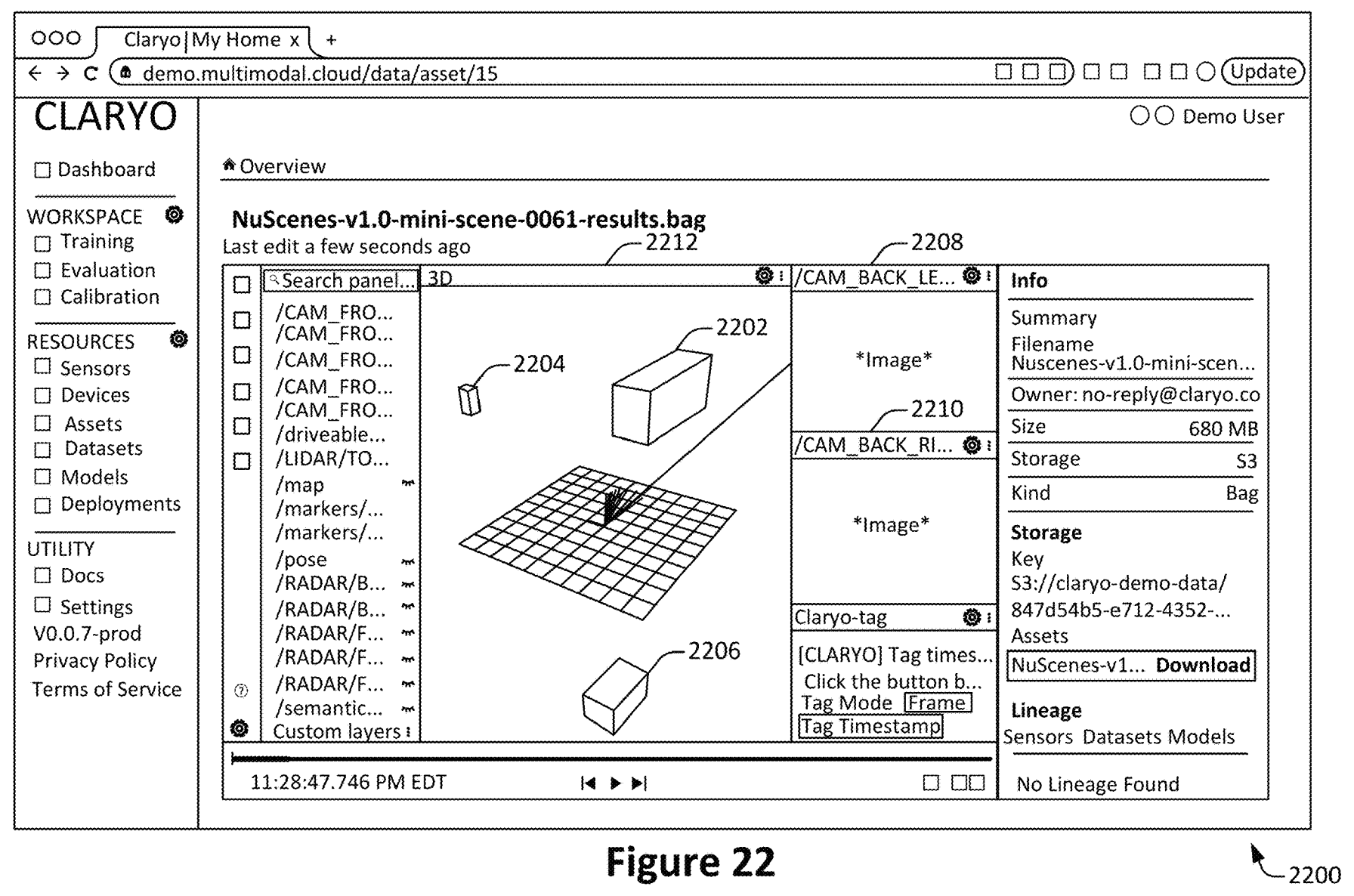

FIG. 22 illustrates an interface 2200 that shows the application of the trained model to data collected by a robot. The model may be deployed for use by robots operating in the environment. For example, image data collected by a robot is shown at 2208 and 2210, while a three-dimensional representation of the environment generated based on the model is shown at 2212. Bounding boxes 2202, 2204, 2206 produced based on object recognition performed by the trained model represent objects in the environment.

Figure 23:
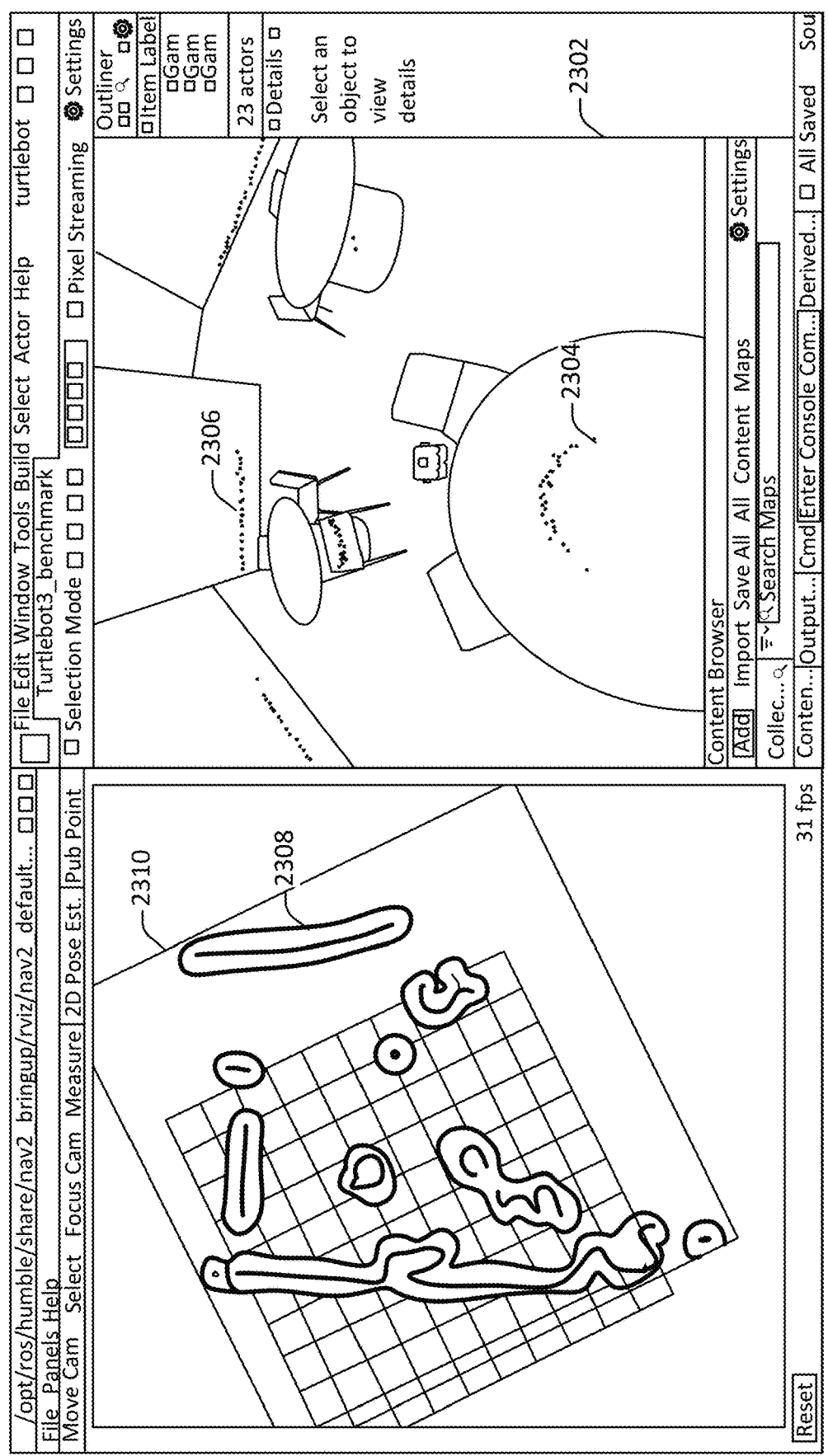

FIG. 23 shows a user interface 2300 that includes a photorealistic and physically realistic simulated 3D model 2302 of an environment, generated in accordance with one or more embodiments. The model includes dots (e.g., 2304, 2306) illustrating points from a 3D point cloud, as well as image data generated by generative AI. The environment is navigable in three dimensions. That is, the environment shown at 2302 is not real image data of the actual environment, but rather is simulated image data generated based on the virtual facility. Because the virtual facility provides a multi-layered representation of the real facility, other views are possible. For example, a top down two-dimensional representation of the virtual facility is shown at 2310, with point clouds (e.g., 2308) represent objects positioned within the virtual facility.

Figure 24:
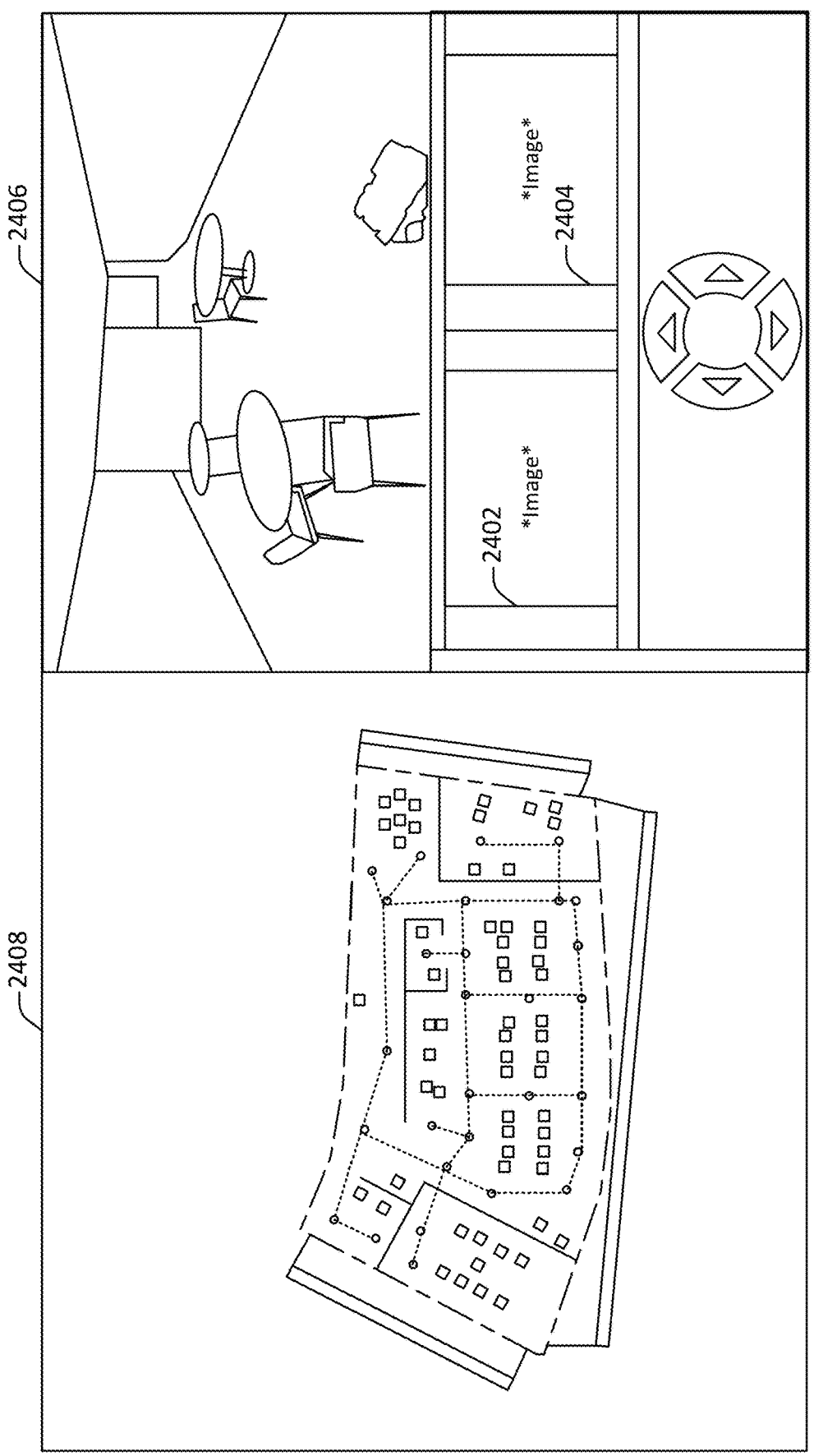

In some embodiments, a simulated robot may be positioned in the environment. The robot's sensor data may be simulated from the perspective of the robot's sensors, and then updated as the robot navigates the simulated environment. FIG. 24 shows a user interface 2400 that includes information for such a simulated robot.

Simulated views from the perspective of the robots cameras may be shown at 2402 and 2404, while a simulated perspective view that includes the simulated robot 2406 is shown at 2408. A simulated two-dimensional map of the facility is shown at 2408.

Figure 25:
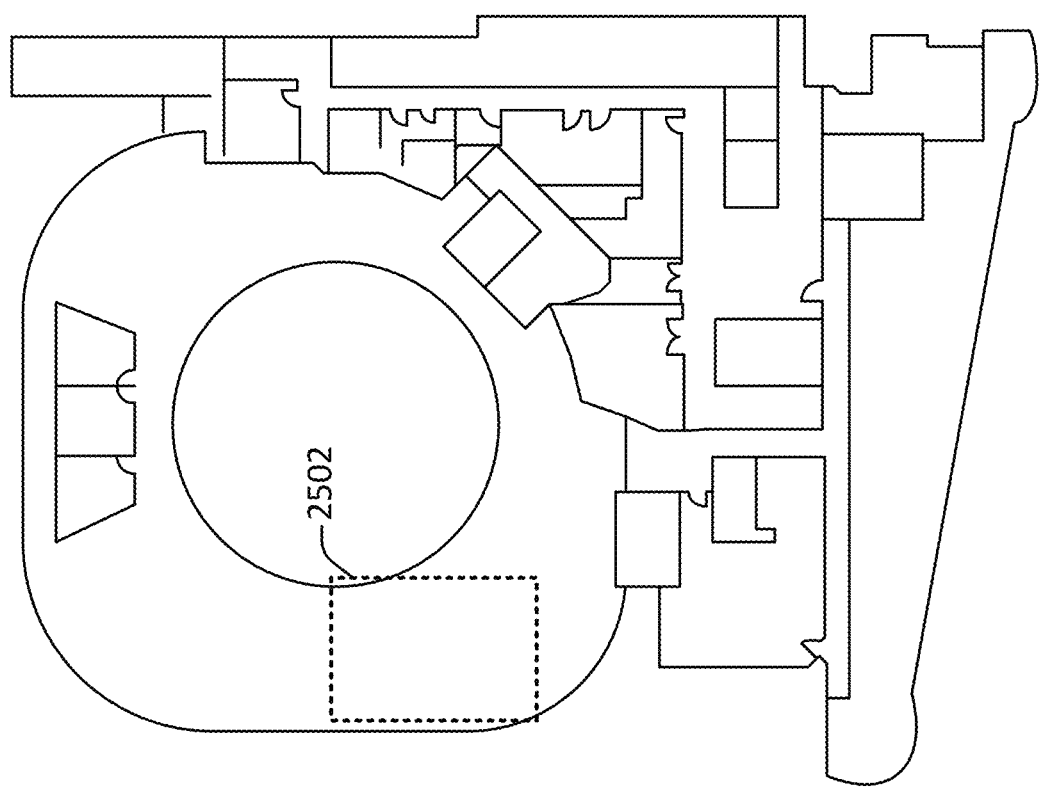

FIG. 25 illustrates a user interface 2500 that includes a top-down view based on the virtual facility. The top-down view includes a region 2502 corresponding to the area represented in FIG. 22, FIG. 23, and FIG. 24. As shown in FIG. 25, local data associated with a particular real or simulated robot or other element of the virtual facility may be understood in the context of a global view of the virtual facility. For instance, the user interface 2500 may be used to map the positions of inventory items, corridors, doors, or other elements of a facility.

Figure 26:
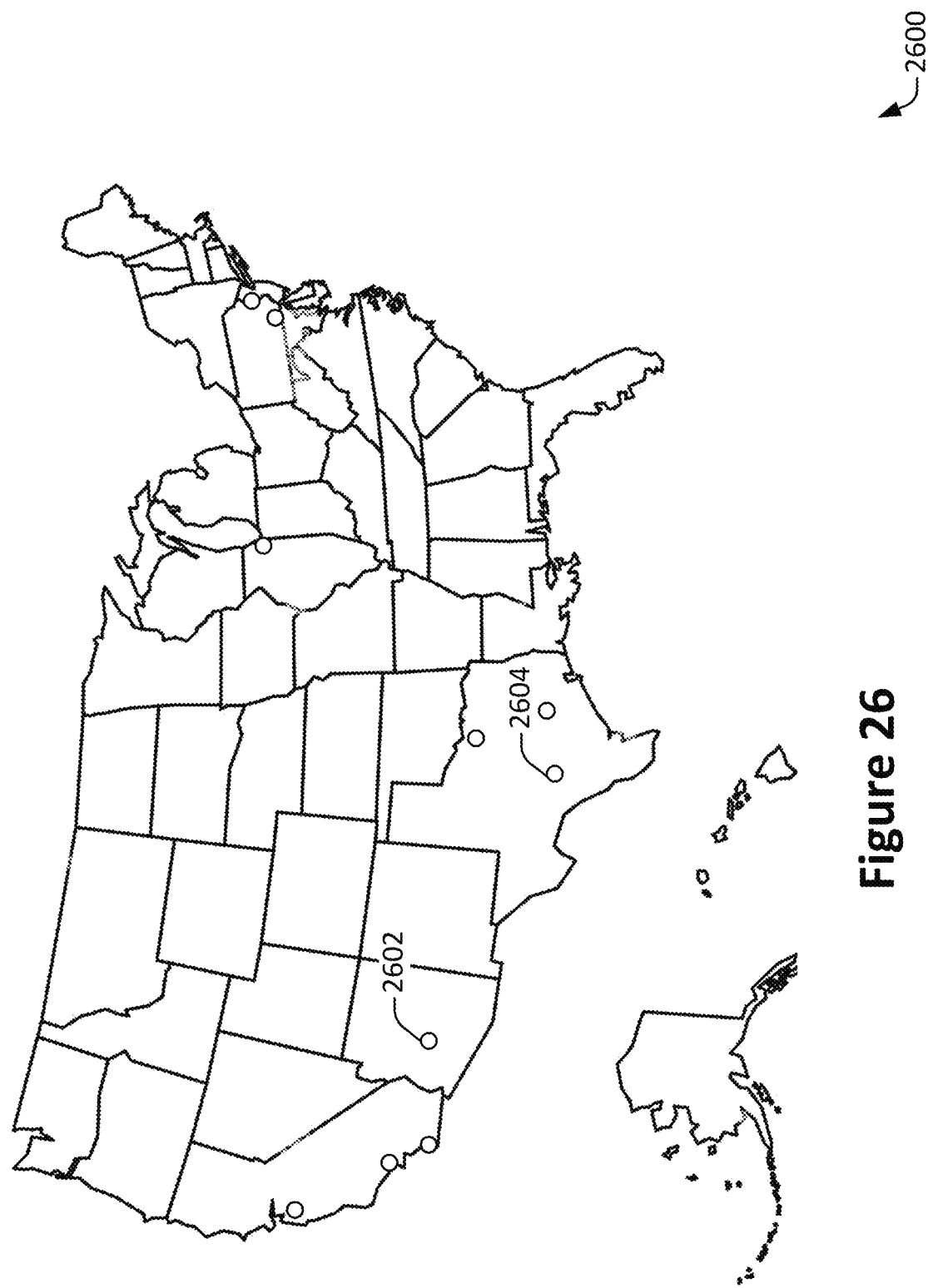

FIG. 26 illustrates a map showing an interface 2600 that provides a selectable, national view of real facilities (e.g., 2602, 2604) for an organization. Such an interface may facilitate the management of deployments as well as the sharing of information across different virtual facilities.

Figure 27:
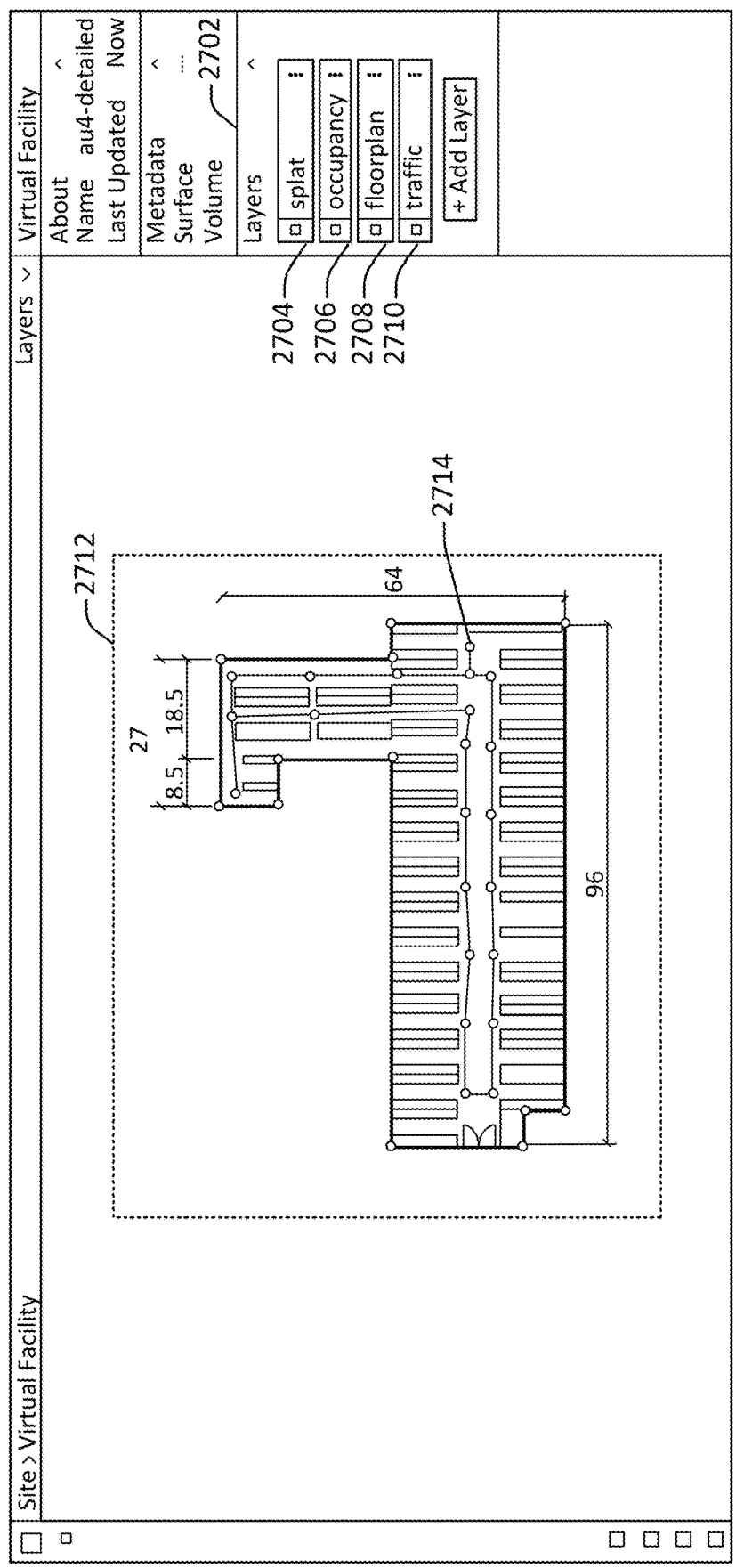

FIG. 27 illustrates a user interface 2700 providing a representation of information included in the different layers of a virtual facility. For instance, the layers splat 2704, occupancy 2706, floorplan 2708, and traffic 2710 are shown, although other layers are possible. At 2712, a combination of layers is shown. Different combinations of layers may be used to perform different tasks, such as the determination of a route at 2714.

Figure 28:
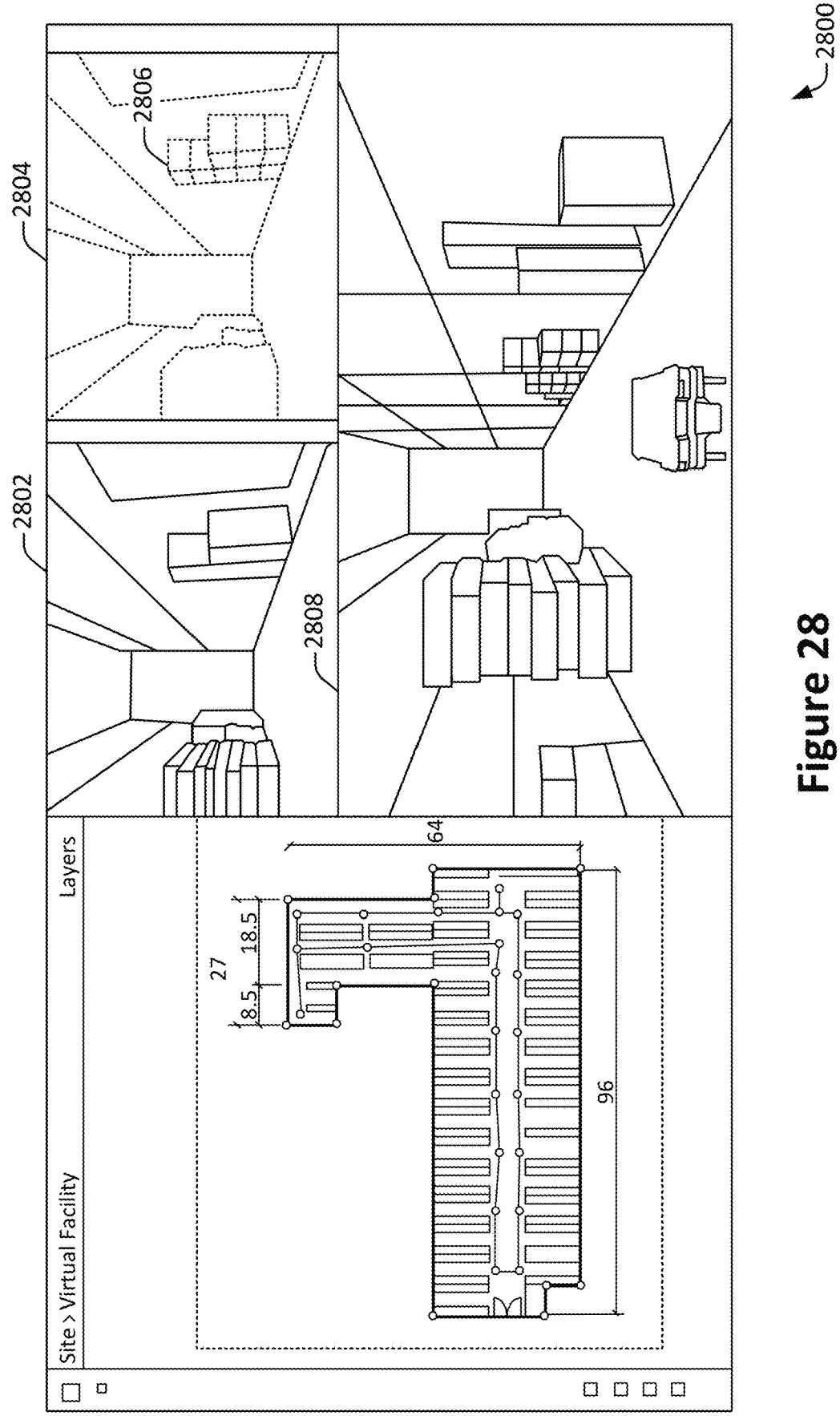
Figure 29:
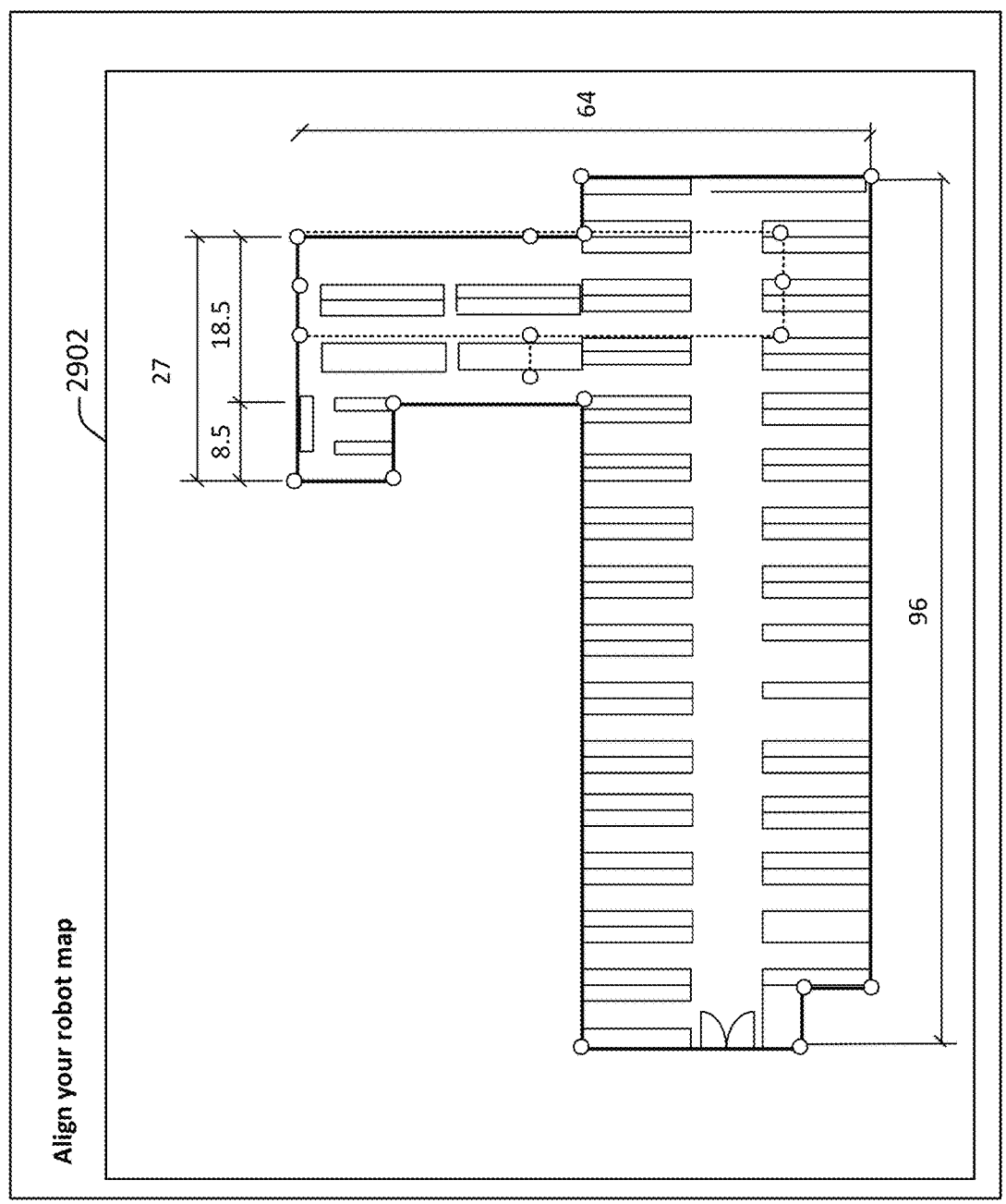

FIG. 28 illustrates a user interface 2800 that integrates the layers shown in FIG. 2700 with photorealistic information. Image data captured by a robot is shown at 2802, whereas 2804 shows a three-dimensional representation of the environment determined by a machine learning model as applied to the image data. For instance, in the three-dimensional representation, bounding boxes e.g., 2806) correspond to objects in and elements of the environment recognized based on the machine learning model. A simulated perspective view of the robot generated based on the virtual facility is shown at 2808. The information determined at FIG. 29 illustrates an interface 2900 for aligning a dynamically determined map of a virtual facility with a pre-determined 2D map. The user interfaces shown herein may be generated at least in part based on semantic information about the environment, for instance by identifying areas to which a robot is permitted or forbidden entry. For example, features in the photorealistic and physically realistic simulated 3D model of an environment may be used to determine a correspondence between the photorealistic and physically realistic simulated 3D model of the environment and a predetermined 2D map of the space that includes such data. As shown in FIG. 29, the maps may be aligned at 2902 to facilitate determining the correspondence.

Figure 30:
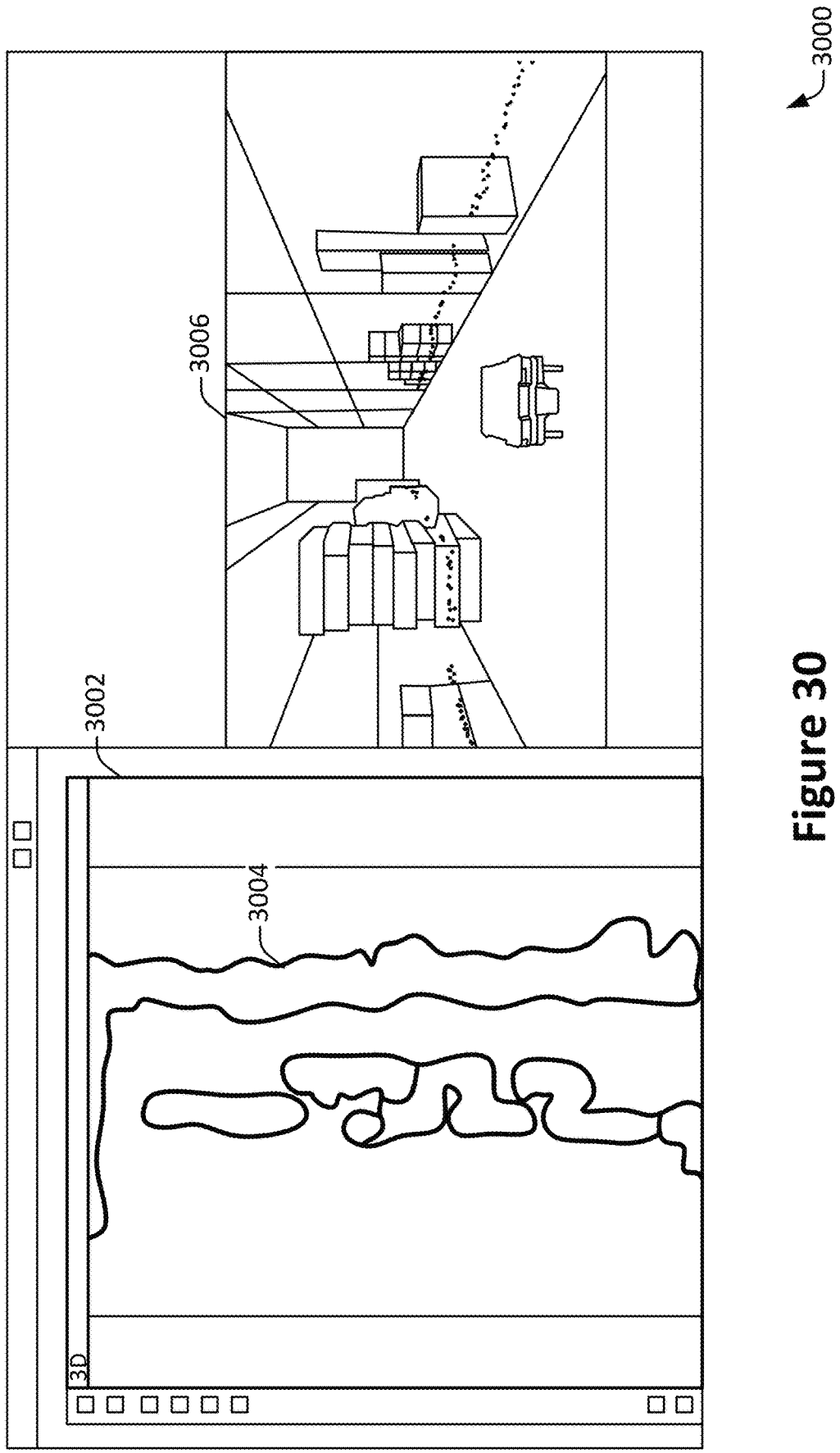

FIG. 30 illustrates an interface 3000 with additional views generated based on the virtual facility, including a point cloud view 3002 that includes 3D point clouds (e.g., 3004) representing obstacles and a simulated 3D perspective view of a robot at 3006.

According to various embodiments, the virtual facility system may interact with one or more mobile devices, whether or not a robot is involved. An example of such a mobile device may be an android handheld of the type provided by companies such as Honeywell and Zebra. As another example, the mobile device may include augmented reality glasses.

In some embodiments, contextual camera data may be streamed from the handheld device. This information may be used to determine the location of the handheld device within the environment based on the photorealistic and physically realistic simulated 3D model, for instance using location cues included in the camera data. The location may then be used for any of a variety of applications, such as guiding a user to a nearest feature or object of a given type in an environment, augmented reality applications, and the like.

According to various embodiments, one application of the communication between the virtual facility system and the handheld device is to guide the user to locations for picking products from a warehouse. For instance, the next pick location may be determined in the photorealistic and physically realistic simulated 3D model of the environment. The user may then be guided from the handheld's current location to the next location, using an efficient path calculated based on the photorealistic and physically realistic simulated 3D model of the environment.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of warehouses. However, the techniques of the present invention apply to a wide variety of physical environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A virtual facility robotics system comprising:
   a storage system storing data collected from a real facility, the data including video of the real facility;
   a data engine configured to train a neural rendering model of the real facility based on the data, the neural rendering model providing a photorealistic three-dimensional representation of the real facility;
   an integration system providing one or more interfaces facilitating communication with one or more control systems associated with the real facility, the one or more control systems including a robot fleet manager configured to control one or more robots operating within the real facility;
   a virtual facility interface system providing access to information stored in a virtual facility that includes the photorealistic three-dimensional representation of the real facility, wherein the virtual facility interface system is configured to provide information to the robot fleet manager via the integration system upon request; and
   a simulator engine configured to simulate a future state of the real facility based on the virtual facility, the future state of the real facility including one or more novel views generated based on the neural rendering model.

2. The virtual facility robotics system recited in claim 1, wherein the virtual facility includes a plurality of layers including a first layer corresponding to the photorealistic three-dimensional representation.

3. The virtual facility robotics system recited in claim 2, wherein the virtual facility includes a second layer providing a dense reconstruction that includes a three-dimensional point cloud determined based on the data.

4. The virtual facility robotics system recited in claim 2, wherein the virtual facility includes a third layer providing a two-dimensional map of the real facility.

5. The virtual facility robotics system recited in claim 4, wherein the two-dimensional map includes location information for the one or more robots or location information for one or more inventory items located within the real facility.

6. The virtual facility system recited in claim 2, wherein the virtual facility includes a fourth layer indicating one or more facility rules selected from a group consisting of: lane directionality, speed limits, exclusion zones, egress markings, lane markings, exclusion zones markings, presence of objects, and absence of objects.

7. The virtual facility robotics system recited in claim 1, wherein the data engine is configured to update the virtual facility based on image data received from the one or more robots.

8. The virtual facility robotics system recited in claim 1, wherein the one or more novel views include simulated sensor data that is simulated from a virtual position corresponding to a simulated location for a sensor associated with a robot of the one or more robots.

9. The virtual facility robotics system recited in claim 1, wherein the future state of the real facility reflects performance of a simulated workflow by updating a simulated version of the virtual facility based on an action performed by a simulated robot.

10. The virtual facility robotics system recited in claim 1, wherein the virtual facility reflects one or more rules governing operation of the real facility, and wherein the future state of the real facility is predicted based on the one or more rules.

11. The virtual facility robotics system recited in claim 1, wherein the one or more interfaces includes a facility management system interface facilitating communication with a facility management system providing access to inventory tracking information that identifies locations for a plurality of inventory items stored within the real facility.

12. The virtual facility robotics system recited in claim 1, wherein the simulator engine includes a plurality of simulator versions, wherein a first simulator version of the plurality of simulator versions includes a three-dimensional rendering engine providing photorealistic visual fidelity.

13. The virtual facility robotics system recited in claim 12, wherein a second simulator version of the plurality of simulator versions includes a linear velocity model configured to determine simulated analytics values.

14. A method implemented at a virtual facility robotics system, the method comprising:
   storing data collected from a real facility in a storage system, the data including video of the real facility;
   training a neural rendering model of the real facility based on the data, the neural rendering model providing a photorealistic three-dimensional representation of the real facility;
   conducting communication via an integration system that includes one or more interfaces to control systems associated with the real facility, the one or more control systems including a robot fleet manager configured to control one or more robots operating within the real facility;

simulating a future state of the real facility based on a virtual facility that includes the photorealistic three-dimensional representation of the real facility, the future state of the real facility including one or more novel views generated based on the neural rendering model; and providing access via a virtual facility interface system to information stored in a virtual facility, wherein the virtual facility interface system is configured to provide information to the robot fleet manager via the integration system upon request, the information including the one or more novel views.

15. The method recited in claim 14, wherein the virtual facility includes a plurality of layers including a first layer corresponding to the photorealistic three-dimensional representation, wherein the virtual facility includes a second layer providing a dense reconstruction that includes a three-dimensional point cloud determined based on the data, wherein the virtual facility includes a third layer providing a two-dimensional map of the real facility, wherein the virtual facility includes a fourth layer indicating one or more facility rules selected from a group consisting of: lane directionality, speed limits, exclusion zones, egress markings, lane markings, exclusion zones markings, presence of objects, and absence of objects.

16. The method recited in claim 14, the method further comprising updating the virtual facility based on image data received from the one or more robots.

17. The method recited in claim 14, wherein the one or more novel views include simulated sensor data that is simulated from a virtual position corresponding to a simulated location for a sensor associated with a robot of the one or more robots.

18. One or more non-transitory computer readable media having instructions stored thereon for performing a method implemented at a virtual facility robotics system, the method comprising:
    storing data collected from a real facility in a storage system, the data including video of the real facility;
    training a neural rendering model of the real facility based on the data, the neural rendering model providing a photorealistic three-dimensional representation of the real facility;
    conducting communication via an integration system that includes one or more interfaces to control systems associated with the real facility, the one or more control systems including a robot fleet manager configured to control one or more robots operating within the real facility;
    simulating a future state of the real facility based on a virtual facility that includes the photorealistic three-dimensional representation of the real facility, the future state of the real facility including one or more novel views generated based on the neural rendering model; and
    providing access via a virtual facility interface system to information stored in a virtual facility, wherein the virtual facility interface system is configured to provide information to the robot fleet manager via the integration system upon request, the information including the one or more novel views.

19. The one or more non-transitory computer readable media recited in claim 18, wherein the virtual facility includes a plurality of layers including a first layer corresponding to the photorealistic three-dimensional representation, wherein the virtual facility includes a second layer providing a dense reconstruction that includes a three-dimensional point cloud determined based on the data, wherein the virtual facility includes a third layer providing a two-dimensional map of the real facility, wherein the virtual facility includes a fourth layer indicating one or more facility rules selected from a group consisting of: lane directionality, speed limits, exclusion zones, egress markings, lane markings, exclusion zones markings, presence of objects, and absence of objects.

20. The one or more non-transitory computer readable media recited in claim 18, the method further comprising updating the virtual facility based on image data received from the one or more robots, wherein the one or more novel views include simulated sensor data that is simulated from a virtual position corresponding to a simulated location for a sensor associated with a robot of the one or more robots.

* * * * *